United States Patent
Lindqvist et al.

(10) Patent No.: US 10,021,571 B2
(45) Date of Patent: Jul. 10, 2018

(54) NOMADIC NODE ATTACHMENT PROCEDURE

(71) Applicant: Telefonaktiebolaget LM Ericsson (publ), Stockholm (SE)

(72) Inventors: Neiva Lindqvist, Vällingby (SE); Hugo Tullberg, Nyköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 117 days.

(21) Appl. No.: 15/028,162

(22) PCT Filed: Sep. 26, 2014

(86) PCT No.: PCT/SE2014/051116
§ 371 (c)(1),
(2) Date: Apr. 8, 2016

(87) PCT Pub. No.: WO2015/053685
PCT Pub. Date: Apr. 16, 2015

(65) Prior Publication Data
US 2016/0269910 A1    Sep. 15, 2016

Related U.S. Application Data

(60) Provisional application No. 61/889,243, filed on Oct. 10, 2013.

(51) Int. Cl.
*H04W 16/04* (2009.01)
*H04W 24/02* (2009.01)
(Continued)

(52) U.S. Cl.
CPC ............. *H04W 16/04* (2013.01); *H04J 14/02* (2013.01); *H04W 24/02* (2013.01); *H04W 48/16* (2013.01); *H04W 84/005* (2013.01)

(58) Field of Classification Search
CPC ..... H04W 24/00; H04W 24/02; H04W 24/04; H04W 88/06
See application file for complete search history.

(56) References Cited

U.S. PATENT DOCUMENTS 8,811,347 B2 * 8/2014 Xu ..................... H04W 8/08
370/331
2012/0320817 A1  12/2012 Xu et al.

FOREIGN PATENT DOCUMENTS

CN       103220738 A    7/2013
WO    2007149025 A1    12/2007
(Continued)

OTHER PUBLICATIONS

Raheem, Rand et al., "From Fixed to Mobile Femtocells in LTE Systems: Issues and Challenges", IEEE, Second International Conference on Future Generation Communication Technology (FGCT), London, United Kingdom, Nov. 12-14, 2013, 207-212.
(Continued)

Primary Examiner — Chandrahas B Patel
(74) Attorney, Agent, or Firm — Murphy, Bilak & Homiller, PLLC

(57) ABSTRACT

Systems and methods related to attachment of nomadic network nodes in a cellular communications network are disclosed. In one embodiment, a method of operation of a network control entity comprises receiving an attach request for attachment of a nomadic node to an anchor node, where the attach request comprises information indicative of one or more requirements of the nomadic node related to traffic and/or service demands. The method further comprises determining whether the one or more requirements of the nomadic node can be fulfilled with existing resources of a transport network that are allocated for the anchor node and, if the one or more requirements of the nomadic node can be fulfilled with the existing resources of the transport network (Continued)

that are allocated for the anchor node, sending, to the anchor node, an attach accept message to thereby accept attachment of the nomadic node to the anchor node.

29 Claims, 19 Drawing Sheets

(51) Int. Cl.
*H04J 14/02* (2006.01)
*H04W 48/16* (2009.01)
*H04W 84/00* (2009.01)

(56) References Cited

FOREIGN PATENT DOCUMENTS

| WO | 2008026977 A1 | 3/2008 |
| WO | 2013023171 A1 | 2/2013 |
| WO | 2013076933 A1 | 5/2013 |

OTHER PUBLICATIONS

Unknown, Author, "Living list for WG2 of FGNGN", International Telecommunication Union, WG2, FGNGN-OD-00249, Gatwick, London, Nov. 14-17, 2005, 1-81.

Unknown, Author, "3rd Generation Partnership Project; Technical Specification Group Radio Access Network; Study on Mobile Relay for Evolved Universal Terrestrial Radio Access (E-UTRA) (Release 12)", 3GPP TR 36.836 V2.0.2, Jul. 8, 2013, pp. 1-35.

\* cited by examiner

NOMADIC NODE ATTACHMENT PROCEDURE

RELATED APPLICATIONS

This application claims the benefit of provisional patent application Ser. No. 61/889,243, filed Oct. 10, 2013, the disclosure of which is hereby incorporated herein by reference in its entirety.

FIELD OF THE DISCLOSURE

The present disclosure relates to a cellular communications network and, in particular, a radio access network of a cellular communications network having nomadic, or moving, radio access nodes.

BACKGROUND

Over the next decade, mobile and wireless traffic is predicted to increase a thousand-fold. This increase is partly due to the ever increasing amount of mobile traffic to and from user devices for all types of applications ranging from e-banking to on-demand video streaming. The predicted increase in mobile and wireless traffic is also due to the increasing interest in machine-to-machine communication over mobile communications networks. In particular, the so-called "Internet of Things" is expected to result in 50 billion connected devices by 2020.

Development of $5^{th}$ Generation (5G) mobile communications networks to, among other things, support the predicted increase in mobile traffic is underway. In order to meet future demands of mobile traffic, it is expected that various technologies will be used. These technologies include Direct Device-to-Device Communication (D2D), MMC, Moving Networks (MNs), Ultra-Dense Networks (UDNs), and Ultra-Reliable Communication (URC).

A MN utilizes nomadic nodes in a dynamic Radio Access Network (RAN) to provide, e.g., improved coverage and/or capacity. A nomadic node is a node that moves from location to location, but is stationary for a relatively long period of time at each location. In a MN, nomadic nodes can function as temporary radio access nodes (e.g., temporary base stations) that provide radio access to nearby wireless devices, which are sometimes referred to as User Equipment devices (UEs). It is expected that nomadic nodes can connect via, e.g., a wireless backhaul network to an existing network infrastructure, e.g., a macro site (cell site gateway), to guarantee global connection (i.e., traffic transport up to the service edge).

A UDN refers to a network in which the density of radio access nodes far exceeds the density of radio access nodes in $3^{rd}$ Generation (3G) and $4^{th}$ Generation (4G) networks. UDNs are expected to play a key part in addressing the predicted increase in traffic demands and high data rates in future networks. A UDN is connected to the backhaul network at an aggregation point, which may also be referred to as an egress point or a connection point. The number of nodes in a UDN can change, either by permanent extension of the UDN (i.e., by deploying more radio access nodes in the UDN) or by temporarily admitting more radio access nodes into the UDN (e.g., by temporarily admitting nomadic node(s) into the UDN).

There is a need for systems and methods for reliable, cost-efficient backhaul for networks, such as MNs and UDNs, having a varying topology.

SUMMARY

Systems and methods related to attachment of nomadic network nodes in a cellular communications network are disclosed. In one embodiment, a method of operation of a network control entity to perform an attachment procedure for a nomadic network node in a cellular communications network is provided. In one embodiment, the method comprises receiving an attach request for attachment of a nomadic node to an anchor node, where the attach request comprises information indicative of one or more requirements of the nomadic node related to traffic and/or service demands. The method further comprises determining whether the one or more requirements of the nomadic node can be fulfilled with existing resources of a transport network that are allocated for the anchor node and, if the one or more requirements of the nomadic node can be fulfilled with the existing resources of the transport network that are allocated for the anchor node, sending, to the anchor node, an attach accept message to thereby accept attachment of the nomadic node to the anchor node. In this manner, attachment of the nomadic node is handled in such a manner that both the traffic and/or service demands of the nomadic node and the available transport network resources to fulfill, or satisfy, the traffic and/or service demands of the nomadic node are taken into consideration. Further, in some embodiments, the attach request from the nomadic node can be utilized to dynamically allocate transport network resources as needed.

In one embodiment, the method of operation of the network control entity further comprises, if the one or more requirements of the nomadic node cannot be fulfilled with the existing resources of the transport network that are allocated for the anchor node, attempting to allocate additional resources of the transport network for the anchor node in order to fulfill the one or more requirements of the nomadic node. The method further comprises sending, to the anchor node, an attach accept message to thereby accept attachment of the nomadic node to the anchor node if attempting to allocate the additional resources of the transport network for the anchor node is successful. In one embodiment, the transport network utilizes a Dense Wavelength Division Multiplexing (DWDM) architecture, and attempting to allocate the additional resources of the transport network for the anchor node comprises attempting to assign one or more additional wavelengths to a link in the transport network utilized by the anchor node.

In one embodiment, the method further comprises sending, to the anchor node, an attach denial to thereby deny attachment of the nomadic node to the anchor node if attempting to allocate the additional resources of the transport network for the anchor node is not successful.

In one embodiment, the method further comprises, if attempting to allocate the additional resources of the transport network for the anchor node is not successful, determining whether the one or more requirements of the nomadic node can be fulfilled by another anchor node and sending, to the anchor node, an attach denial comprising a recommendation that the nomadic node attach to the other anchor node if the one or more requirements of the nomadic node can be fulfilled by the other anchor node.

In one embodiment, the method further comprises sending, to the anchor node, an attach denial and placing the nomadic node and/or the anchor node in an aware state if attempting to allocate the additional resources of the transport network for the anchor node is not successful. In one embodiment, the method further comprises, after sending the attach denial and placing the nomadic node and/or the anchor node in the aware state, sending, to the anchor node, an attach accept message to thereby accept attachment of the nomadic node to the anchor node when the one or more requirements of the nomadic node are capable of being fulfilled with the existing resources of the transport network that are allocated for the anchor node. In another embodiment, the method further comprises, after sending the attach denial and placing the nomadic node and/or the anchor node in the aware state, sending, to the anchor node, an attach accept message to thereby accept attachment of the nomadic node to the anchor node when attempting to allocate the additional resources of the transport network for the anchor node is successful.

In one embodiment, the method further comprises sending, to the anchor node, an attach accept message with one or more conditions to thereby accept attachment of the nomadic node to the anchor node with the one or more conditions. In one embodiment, sending the attach accept message with the one or more conditions comprises sending the attach accept message with the one or more conditions if attempting to allocate the additional resources of the transport network for the anchor node is not successful (i.e., unsuccessful).

In one embodiment, the method further comprises sending, to the anchor node, an attach accept message with one or more conditions to thereby accept attachment of the nomadic node to the anchor node with the one or more conditions if the one or more requirements of the nomadic node can be fulfilled with the existing resources of the transport network that are allocated for the anchor node.

In one embodiment, the one or more conditions limit the attachment of the nomadic node to the anchor node to a local network including the anchor node. In another embodiment, the one or more conditions are such that at least one of the one or more requirements of the nomadic node are not guaranteed.

In one embodiment, the method further comprises, after accepting attachment of the nomadic node to the anchor node with the one or more conditions, monitoring for an anchor node that is able to fulfill the one or more requirements of the nomadic node and, upon identifying an anchor node that is able to fulfill the one or more requirements of the nomadic node, sending an attach request or an attach recommendation for attachment of the nomadic node to the anchor node that is able to fulfill the one or more requirements of the nomadic node.

In one embodiment, the method of operation of the network control entity further comprises receiving a second attach request for attachment of the nomadic node to a second anchor node, where the attach request and the second attach request are received substantially simultaneously. The method further comprises making a determination that the attach request and the second attach request both originate from the same nomadic node and processing the attach request and the second attach request based on the determination that the attach request and the second attach request both originate from the same nomadic node.

In one embodiment, the one or more requirements of the nomadic node include data rate, expected attachment time, delay, latency, reliability, security, and/or expected traffic volume.

In one embodiment, the method of operation of the network control entity further comprises, in association with accepting the attachment of the nomadic node to the anchor node, defining a preplanned alternate route for the nomadic node in case the anchor node de-attaches from the cellular communications network.

In one embodiment, the method of operation of the network control entity further comprises, over time, receiving multiple additional attach requests for attachment of multiple nomadic nodes to multiple anchor nodes, and dynamically allocating resources of the transport network to the anchor nodes based on requirements of the nomadic nodes as indicated by information included in the additional attach requests. In one embodiment, the transport network utilizes a DWDM architecture, and dynamically allocating the resources of the transport network comprises dynamically assigning wavelengths to links utilized by the anchor nodes based on the requirements of the nomadic nodes included in the additional attach requests.

In one embodiment, the transport network is a backhaul network. In another embodiment, the cellular communications network comprises a Centralized Radio Access Network (C-RAN), and the transport network comprises a backhaul network and/or a fronthaul network of the C-RAN.

In one embodiment, a network node configured to operate according to any of the embodiments of the method of operation of the network control entity described above is provided.

In one embodiment, a network control entity for a cellular communications network is provided. The network control entity comprises a communication subsystem and a processing subsystem configured to: (a) receive, via the communication subsystem, an attach request for attachment of a nomadic node to an anchor node, where the attach request comprises information indicative of one or more requirements of the nomadic node related to traffic and/or service demands; (b) determine whether the one or more requirements of the nomadic node can be fulfilled with existing resources of a transport network that are allocated for the anchor node; and (c) if the one or more requirements of the nomadic node can be fulfilled with the existing resources of the transport network that are allocated for the anchor node, send, to the anchor node, an attach accept message to thereby accept attachment of the nomadic node to the anchor node.

In one embodiment, a network control entity is configured according to any one of the methods of operation of a network control entity described herein.

In one embodiment, a computer program comprising instructions which, when executed on at least one processor, cause the at least one processor to carry out any of the methods of operation of a network control entity described herein is provided. In another embodiment, a carrier containing the computer program is provided, wherein the carrier is one of an electronic signal, an optical signal, a radio signal, or a computer readable storage medium.

In one embodiment, a method of operation of a nomadic node in a cellular communications network is provided. The method comprises detecting an anchor node and sending an attach request to the anchor node, where the attach request comprises information indicative of one or more requirements of the nomadic node related to traffic and/or service demands of the nomadic node. In one embodiment, the method further comprises receiving a response to the attach request from the anchor node. In one embodiment, the response is an attach accept. In another embodiment, the response is an attach accept with conditions.

In one embodiment, the method of operation of the nomadic node further comprises detecting one or more additional anchor nodes and sending an attach request to the one or more additional anchor nodes in addition to the attach request sent to the anchor node. In one embodiment, the method of operation of the nomadic node further comprises receiving attachment responses from the anchor node and the one or more additional anchor nodes, determining that the attachment responses from at least two anchor nodes are attachment accepts, selecting one of the at least two anchor nodes as a selected anchor node, and proceeding with attachment to the selected anchor node.

In one embodiment, a nomadic node is provided that operates according to any of the methods of operation of a nomadic node described above.

In one embodiment, a nomadic node for a cellular communications network comprises a radio subsystem and a processing subsystem configured to detect an anchor node and send, via the radio subsystem, an attach request to the anchor node, the attach request comprising information indicative of one or more requirements of the nomadic node related to traffic and/or service demands of the nomadic node.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
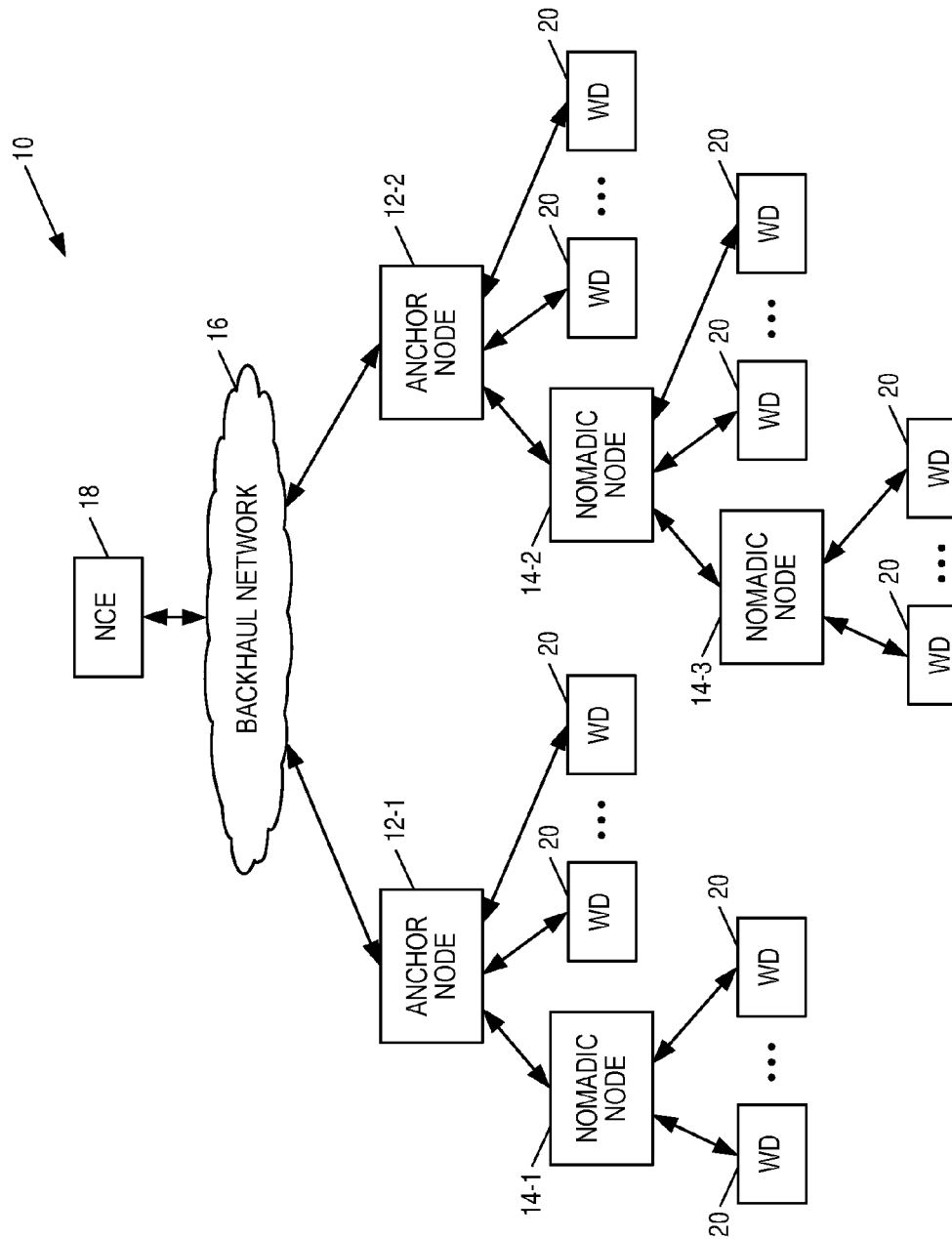
FIG. 1 illustrates a cellular communications system that includes a Radio Access Network (RAN) enabling attachment and dynamic transport network assignment for nomadic nodes according to one embodiment of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

In a conventional cellular communications network, base stations (e.g., enhanced Node Bs (eNBs)) and other access points in the Radio Access Network (RAN) provide radio access to wireless devices. A backhaul network provides transport of information between the RAN and the service edge, which is the connection with the core network (e.g., the Internet). The backhaul network can be implemented in several ways, both wired, e.g., optical fiber or cable, or wireless, e.g., microwave links (e.g., MINI-LINK microwave solutions manufactured and sold by Ericsson. The capacity of the backhaul network limits the amount of traffic that can be handled by the RAN. Further, the capacity of the backhaul network is dimensioned for a static network topology or slowly extended network.

Moving Networks (MNs) and Ultra-Dense Networks (UDNs) have dynamic network topologies. As such, the backhaul network, and more generally the transport network, must be able to support these dynamic network topologies. In particular, the backhaul or transport network must be able to support the dynamic transport network requirements of these dynamic network topologies. For instance, in a MN, the nomadic nodes are expected to attach and de-attach from different anchor nodes in the RAN, which results in dynamic transport network requirements of the anchor nodes. Further, with respect to UDNs, the actual size of a UDN is not known at the time that the backhaul network is installed. Network nodes may be added to a UDN, which in turn changes the transport network requirements of the UDN. This issue is further exacerbated when nomadic nodes are introduced into UDNs. The transport network must then support both the UDN and any additional nomadic nodes attached to the UDN.

In all cases described above, high demands are imposed on the deployed transport network and, in particular, on backhaul provisioning since the addition of several new nodes can result in, e.g., traffic overload. Over-dimensioning of the backhaul network is not an option to prevent such problems since it would not be economically viable. Furthermore, the dynamic nature of the add/drop connections of nomadic nodes offers an additional challenge, since the backhaul network has to constantly adapt accordingly.

A similar problem arises in a dense network/heterogeneous network where small cell base stations, e.g., pico or femto cells, are put in sleep mode to save energy when traffic demands are low. Turning on a small cell changes the transport network requirements.

Thus, there is a need for systems and methods for reliable, cost-efficient backhaul for networks, such as MNs and UDNs, having a varying topology.

In this regard, systems and methods relating to attachment and dynamic transport network resource allocation for nomadic nodes in a RAN of a cellular communications system are disclosed according to one embodiment of the present disclosure. In this regard, FIG. 1 illustrates one example of a cellular communications system 10 according to one embodiment of the present disclosure. As illustrated, the cellular communications system 10 includes a RAN including a number of anchor nodes 12-1 and 12-2 (generally referred to herein collectively as anchor nodes 12 and individually as anchor node 12) and a number of nomadic nodes 14-1, 14-2, and 14-3 (generally referred to herein collectively as nomadic nodes 14 and individually as nomadic node 14).

As used herein, an "anchor node" is a network node, and more specifically a radio access node in the RAN, that is integrated with the RAN and has operational backhaul capabilities. The anchor nodes 12 may include, for example, base stations (e.g., eNBs), Remote Radio Heads (RRHs), or other RAN nodes. In one embodiment, some or all of the anchor nodes 12 are fixed, or permanent, radio access nodes. Note that, in one embodiment, the nomadic nodes 14 may be considered anchor nodes when the nomadic nodes 14 are in the attached state.

As used herein, a "nomadic node" (which may also be referred to herein as a nomadic base station (e.g., a nomadic eNB (NeNB) or more generally as a nomadic radio access node) is a movable node that has the capability of establishing a cell (e.g., transmit pilots/reference signals necessary for wireless devices (e.g., Mobile Stations (MSs) or User Equipment devices (UEs)) to attach to the cell). Thus, in other words, the nomadic nodes 14 provide base station or, more generally, radio access node functionality. One example of a nomadic node 14 is a small, or low power, base station mounted on a moving vehicle.

Note that while conventional wireless devices (e.g., a $3^{rd}$ Generation Partnership Project (3GPP) Long Term Evolution (LTE) UE) are moving devices, these conventional wireless devices are not nomadic nodes in the sense that the term "nomadic node" is used herein because a conventional wireless device does not normally carry traffic flow for other wireless devices (e.g., other 3GPP LTE UEs). In other words, a conventional wireless device is not a nomadic node since the conventional wireless device does not provide base station, or radio access node, functionality. However, in some embodiments, a nomadic node 14 may be a node that is itself capable of generating traffic (e.g., a cellular phone operating as both a relay for other wireless devices and also generating traffic itself such as, e.g., traffic for a phone call). In this case, the traffic to/from the nomadic node 14 may be considered as two separate traffic flows (i.e., a first traffic flow for nomadic node (e.g., relay) operation and a second traffic flow for the device's own traffic) or as a single integrated flow, in which case the nomadic node 14 is logically camping on itself.

As illustrated in FIG. 1, the anchor nodes 12 are connected to a backhaul network 16. Note that, as used herein, a "backhaul network" is a wired and/or wireless network that provides transport of traffic/information between the RAN and the service edge. The backhaul network 16 illustrated as a cloud between the anchor nodes 12 and the service edge in FIG. 1 is the backhaul network 16 of the anchor nodes 12. However, it is to be understood that the backhaul network 16 for the nomadic nodes 14 further includes wireless links between the nomadic nodes 14 and their corresponding anchor nodes 12. For example, the backhaul network 16 for the nomadic node 14-3 includes: (i) a wireless link between the nomadic node 14-3 and the nomadic node 14-2, (ii) a wireless link between the nomadic node 14-2 and the anchor node 12-2, (iii) a link between the anchor node 12-2 and the backhaul network 16, and (iv) any links through the backhaul network 16 to the service edge. In contrast, as discussed below with respect to, e.g., FIG. 15, the cellular communications network 10 may alternatively use a Centralized or Cloud RAN (C-RAN) architecture in which the baseband functionality of multiple remote radio equipments (e.g., Remote Radio Heads (RRHs)) is centralized in one or more centralized processing units. The centralized processing unit(s) is(are) connected to the remote radio equipments (e.g., the anchor nodes 12) via a fronthaul network. The term "transport network" is used herein as a general term referring to the network infrastructure and the network connectivity links including the backhaul network 16 and, in a C-RAN architecture, a fronthaul network. Thus, in one embodiment, the transport network includes only the backhaul network. In another embodiment, the transport network includes both the backhaul network and a fronthaul network. Further, the term "transport network resources" is used herein as a general term to refer to backhaul network resources and, in some embodiments, fronthaul network resources.

The backhaul network 16 may be a wired network (e.g., an optical fiber network or cable network) or a wireless network (e.g., a network of microwave links). In general, the backhaul network 16 consists of the infrastructure necessary to transport the traffic/information between the RAN and the service edge. In one embodiment, the backhaul network 16 is an all optical transport network (e.g., a Dense Wavelength Division Multiplexing (DWDM)-centric network). In some embodiments, the backhaul network 16 includes an optical layer control entity that provides the capability to control or optimize traffic flows through the backhaul network 16. The optical layer control entity may, at least in part, be part of the NCE 18 or may be a completely separate entity. Importantly, the NCE 18 is in a management layer above the optical layer and can make use of the functionalities of the optical layer, but the NCE 18 may or may not have full knowledge of the optical layer control entity operations. Such a backhaul network 16 enables assignment of optical wavelengths on demand to different areas (i.e., to different local access networks or anchor nodes 12) and, consequently, the increase or decrease of transport network capacity according to, e.g., traffic types and time varying needs. This architecture relaxes the need to over dimension the backhaul network 16, a fact that could be considered during network deployment planning to cope with the nomadic nodes 14 (i.e., moving networks).

A Network Control Entity (NCE) 18 is also connected to the backhaul network 16. The NCE 18 is implemented in hardware, software, or a combination thereof. In one embodiment, the NCE 18 is implemented in a combination of hardware and software. The NCE 18 may be implemented as its own network node or may be implemented as part of another network node. As discussed below in detail, the NCE 18 operates to control attachment of the nomadic nodes 14 to the anchor nodes 12 and to dynamically assign, or allocate, transport network resources (e.g., resources of the backhaul network 16) based on the dynamically changing topology of the RAN due to movement of the nomadic nodes 14.

The NCE 18 is aware of the network topology of the RAN and controls network resources such as backhaul resources. The NCE 18, or part of its functionalities, can be located in any point of presence/node in the network, e.g., close to the RAN, in the aggregation network, in the service edge, etc. The aggregation network aggregates traffic from multiple anchor nodes 12 and transports data to/from the RAN. Thus, the aggregation network can be part of the backhaul network 16 but could alternatively be above the NCE 18 depending on where in the logical and physical network that the NCE 18 is located. The NCE 18 is aware of the (local) backhaul information and can adapt the resources allocated to each network node. The backhaul information is network information such as, for example, topology, infrastructure, connectivity links budget (e.g., capacity, latency), etc. In the case of a DWDM-centric transport solution, a lambda controller, which determines which and how many wavelengths are used to carry traffic to a specific network node, can be used to adapt the backhaul resources.

The anchor nodes 12 and the nomadic nodes 14 provide radio access to wireless devices located in corresponding cells served by the anchor nodes 12 and the nomadic nodes 14. In this example, in addition to serving as the anchor node of the nomadic node 14-1 (i.e., serving as the point by which the nomadic node 14-1 attaches to the backhaul network 16) at this particular point in time, the anchor node 12-1 provides radio access to a number of wireless devices 20 located in the cell served by the anchor node 12-1. Likewise, in addition to serving as the anchor node of the nomadic node 14-2 (i.e., serving as the point by which the nomadic node 14-2 attaches to the backhaul network 16) at this particular point in time, the anchor node 12-2 provides radio access to a number of wireless devices 20 located in the cell served by the anchor node 12-2. The nomadic nodes 14-1 and 14-2 provide radio access for wireless devices 20 located in the cells (i.e., moving cells) served by the nomadic nodes 14-1 and 14-2. In addition, in this example, the nomadic node 14-2 also serves as an anchor node for the nomadic node 14-3. The nomadic node 14-3 provides radio access for wireless devices 20 located in the cell (i.e., a moving cell) served by the nomadic node 14-3. In some embodiments, the anchor nodes 12 may be part of the same or different UDNs.

Further, by attaching to a particular anchor node 12 that is part of a UDN, a nomadic node 14 joins that UDN.

Figure 2A:
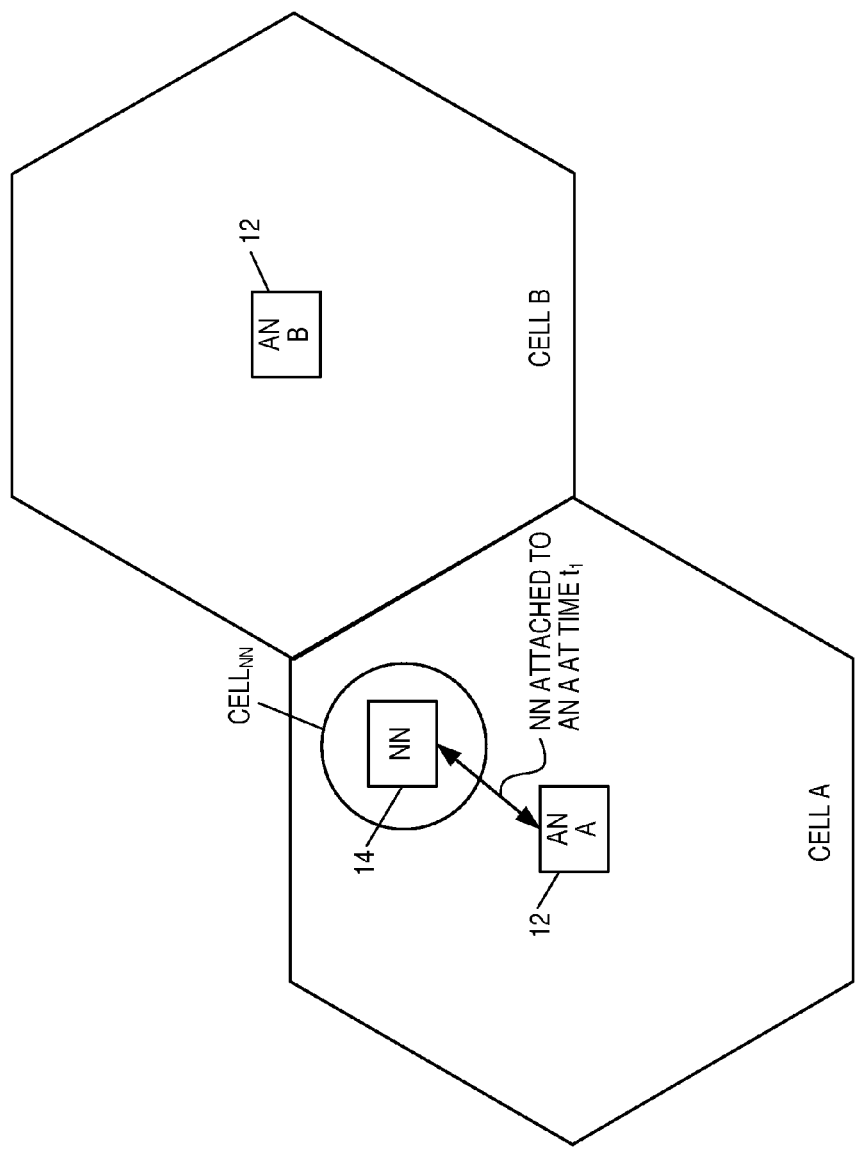
FIGS. 2A and 2B illustrate attachment and de-attachment of a nomadic node according to one embodiment of the present disclosure.
Figure 2B:
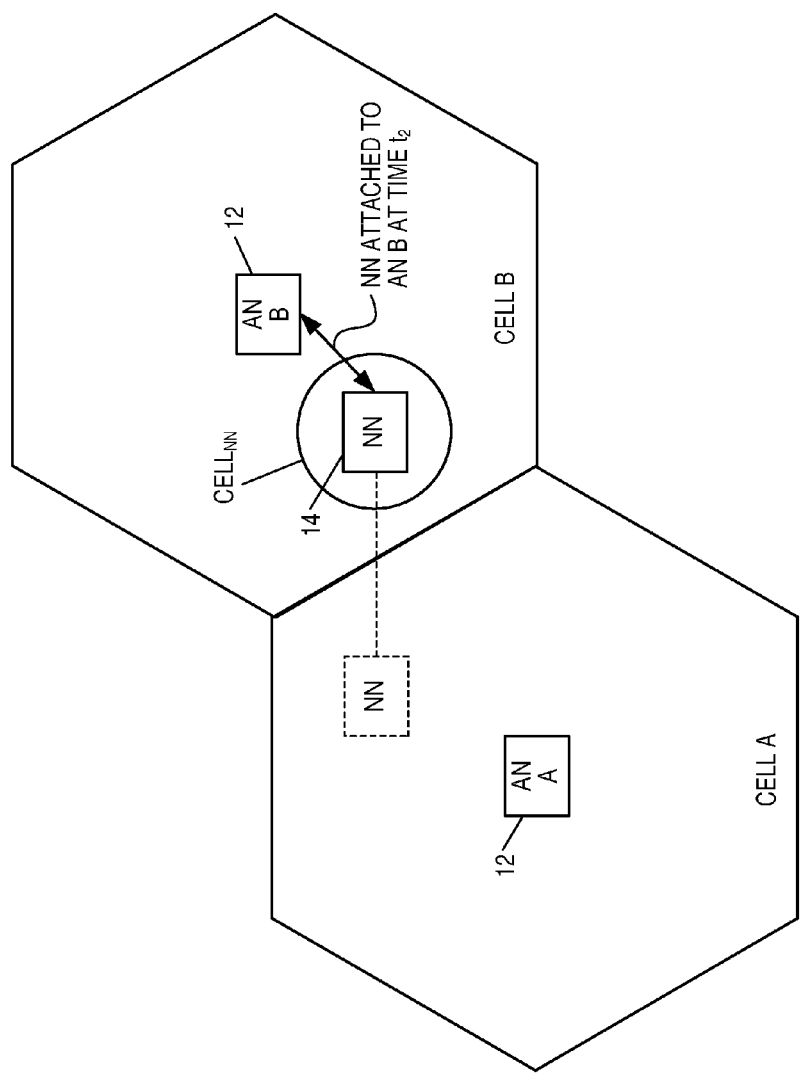

When moving from one location to another, a particular nomadic node 14 drops, or de-attaches, from one anchor node 12 and attaches to another anchor node 12. For example, as illustrated in FIG. 2A, the nomadic node 14 (referenced as NN) is located in a cell (cell A) served by an anchor node 12 (referenced as AN A) at a time $t_1$. The nomadic node 14 (NN) uses an attach procedure (e.g., one of the attach procedures described below) to attach to the anchor node 12 (AN A). Thus, the nomadic node 14 (NN) is attached to the anchor node 12 (AN A) and, in some embodiments, the global network (i.e., the backhaul network 16 up to the service edge) through the anchor node 12 (AN A). As illustrated in FIG. 2B, between time $t_1$ and a time $t_2$, the nomadic node 14 (NN) moves out of the cell (cell A) served by the anchor node 12 (AN A) and into a cell (cell B) served by another anchor node 12 (referenced as AN B). The nomadic node 14 (NN) is detached from the anchor node 12 (AN A) and uses an attachment procedure (e.g., one of the attachment procedures described below) to attach to the anchor node 12 (AN B). At that point, the nomadic node 14 (NN) is attached to the anchor node 12 (AN B) and, in some embodiments, the global network through the anchor node 12 (AN B). By de-attaching from the anchor node 12 (AN A) and attaching to the anchor node 12 (AN B), the movement of the nomadic node 14 (NN) results in dynamically changing the requirements on the backhaul network 16. The NCE 18 may, in some embodiments, dynamically allocate backhaul resources to the anchor nodes 12 (AN A and AN B) to enable fulfillment of the requirements of the nomadic node 14 (NN) as the nomadic node 14 (NN) moves from the cell (cell A) served by the anchor node 12 (AN A) to the cell (cell B) served by the anchor node 12 (AN B).

Figure 3:
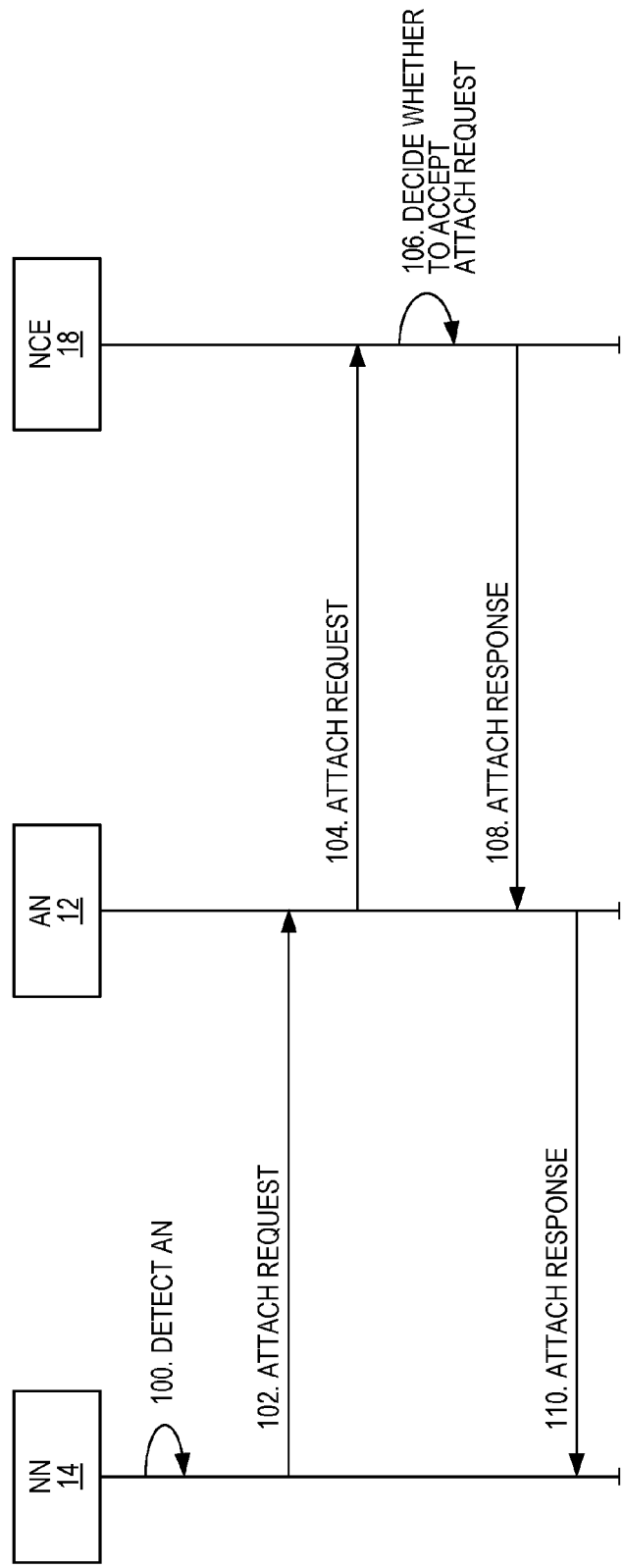
FIG. 3 illustrates an attachment procedure for a nomadic node according to one embodiment of the present disclosure.

FIG. 3 illustrates a nomadic node attachment procedure according to one embodiment of the present disclosure. As illustrated, the nomadic node 14 detects one of the anchor nodes 12 (step 100). The nomadic node 14 may detect the anchor node 12 using any suitable technique. For example, the nomadic node 14 may detect the anchor node 12 using a procedure similar to the conventional cell search procedure performed by UEs in a 3GPP LTE or LTE-Advanced network. However, the present disclosure is not limited thereto. Other techniques may be used.

After detecting the anchor node 12, the nomadic node 14 sends a nomadic node attach, or attachment, request to the anchor node 12 (step 102). The attach request includes information indicative of one or more requirements of the nomadic node 14. In general, the requirement(s) of the nomadic node 14 are requirement(s) related to traffic and/or service demands of the nomadic node 14. In some embodiments, the attach request also includes a nomadic node identifier of the nomadic node 14 (e.g., a nomadic node identification number). The requirements of the nomadic node 14 may include, for example:

a data rate requirement (peak/average),
  an expected attachment time requirement,
  a delay requirement,
  a latency requirement,
  a reliability requirement,
  an expected traffic volume requirement,
  one or more security requirements, and/or
  a requirement regarding the need of the nomadic node 14
    for a global connection (i.e., a connection up to the
    service edge of the backhaul network 16) or local
    connection only (e.g., within a UDN).

The data rate requirement can be, e.g., either a single number with a minimum data rate (e.g., a data rate that the nomadic node 14 wants to be able to offer the wireless devices 20 that attach to the nomadic node 14), a distribution of data rates ($x_1$ Megabits per second (Mbps) with probability $y_1\%$, $x_2$ Mbps with probability $y_2\%$, ..., $x_N$ Mbps with probability $y_N\%$) based on, e.g., traffic measurements aggregated by the nomadic node 14, or the like.

The expected attachment time requirement can be expressed as a single number indicating an expected amount of time that the nomadic node 14 expects to be attached to the anchor node 12 or a distribution of attachment times based on, e.g., historical information collected by the nomadic node 14. The expected attachment time requirement affects, for example, the amount of time that any additional backhaul, or transport, resources will be needed, as discussed below.

In a similar manner, the delay requirement may also be expressed as, e.g., a single value or a distribution. For example, the delay requirement can be a single number indicative of a maximum allowed delay. In some embodiments, if there is no delay requirement, the delay requirement may be set to a value or some indicator of no delay requirement. In one embodiment, a backhaul link between the anchor node 12 and the nomadic node 14 is over the air and may limit the maximum data rate and minimum delay. Current RAN delays are 10 milliseconds (ms) for 3GPP LTE. In future networks (e.g., $5^{th}$ Generation (5G) networks), the RAN delays will most likely be lower.

In a similar manner, the latency requirement may also be expressed as, e.g., a single value or a distribution.

The reliability requirement can be expressed as a combination of bitrate, bit error probability, and delay, e.g., supporting at least X Mbps/kilobits per second (kbps)/gigabits per second (Gbps) with at most a delay of Y ms with a certain probability. These parameters may be scalar values or densities.

The expected traffic volume requirement may also be expressed as, e.g., a single value or a distribution of values. The expected traffic volume related to the data rate, an expected number of wireless devices 20 attached to the nomadic node 14, and an expected attachment time of the nomadic node 14 to the anchor node 12 may also be or affect the requirements of the nomadic node 14. If traffic equalization over time is possible, the expected traffic volume may affect the backhaul requirements. Otherwise, the data rate requirement may be sufficient.

The one or more security requirements may relate to traffic classes and/or the issue of global or local connectivity. Note that global connectivity is connectivity to the service edge, or core network, via the backhaul network 16. In contrast, local connectivity is connectivity to a local network (e.g., a UDN) where such local connectivity does not extend to the service edge, or core network. In one embodiment, there may be only one security class, authentication of users. In another embodiment, there may be multiple security classes and such class information may be included as a security requirement.

Concerning global and local connectivity, if a nomadic node 14 is granted local access (e.g., as in the example of FIG. 9 below), then the one or more security requirements may include whether authentication can be performed if only local access is granted. If authentication cannot be done if the nomadic node 14 is granted only local access, then, for example, either no wireless devices 20 can attach to the nomadic node 14 or wireless devices 20 can attach to the nomadic node 14 with some restriction since they cannot be authenticated. Charging may not be possible either. In some embodiments, the additional backhaul traffic for authentication and charging is so limited that authentication and charging traffic can always be carried by the transport network even if no user traffic can be carried.

In all cases above, the nomadic node 14 can, in one embodiment, accumulate statistics (e.g., traffic statistics, attachment time statistics, and/or any other relevant statistics) for its attachment periods to different anchor nodes 12, possibly also conditioned on location information. The nomadic node 14 may then utilize the statistics for more precise requirements for future attach requests.

The requirements of the nomadic node 14 may be included in the attach request or otherwise indicated by information in the attach request. For example, different traffic classes may be defined where each traffic class has associated requirements (e.g., data rate requirement, delay requirement, etc.). The desired traffic class may then be communicated in the attach request. The requirements of the nomadic node can then be determined from the requested traffic class.

The anchor node 12 forwards, or redirects, the attach request to the NCE 18 (step 104). The NCE 18 then decides whether to accept the attach request (step 106). The decision is based on the requirements of the nomadic node 14 as well as the capabilities of the backhaul network 16. After making the decision, the NCE 18 sends an attach response to the anchor node 12, which in turn forwards, or redirects, the attach response to the nomadic node 14 (steps 108 and 110). As discussed below, depending on the embodiment, the attach response may be an attach accept, an attach denial, an attach accept with conditions, or an attach denial with a recommendation. While not illustrated, if the attach request is accepted, the nomadic node 14 proceeds with attachment to the anchor node 12. If the attach request is denied, the nomadic node 14 may then search for a new anchor node 12 and repeat the process.

Figure 4:
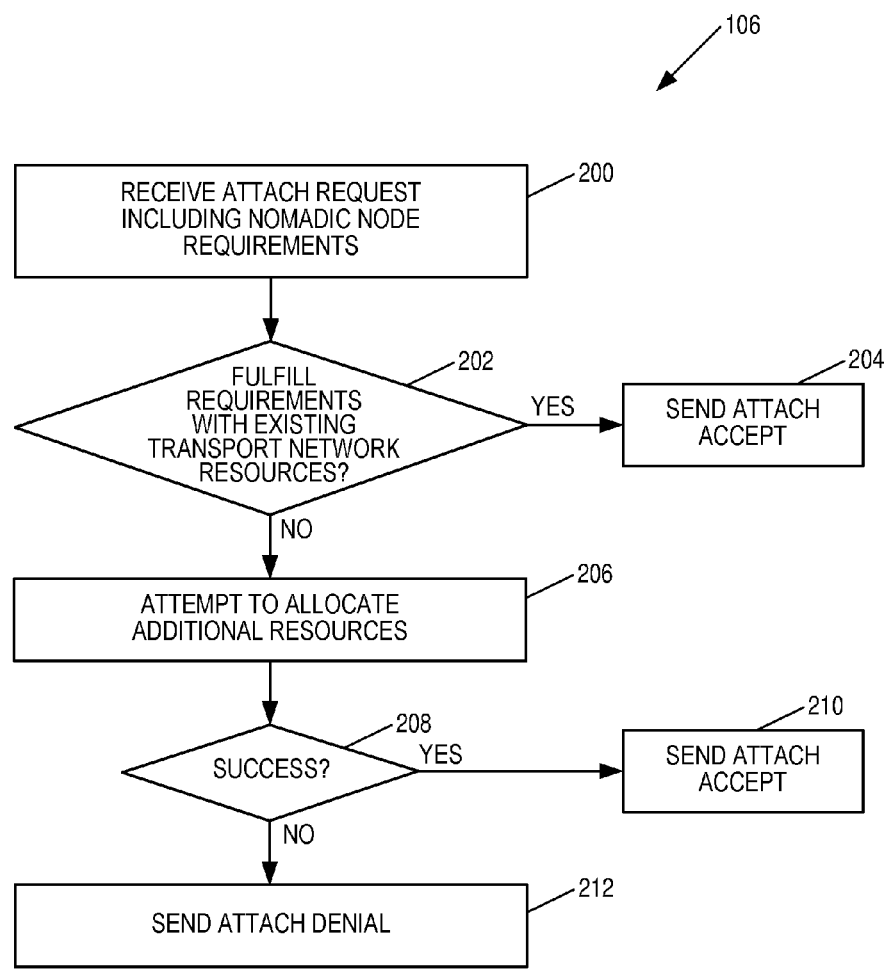
FIG. 4 illustrates a process for deciding whether to accept an attach request of a nomadic node according to one embodiment of the present disclosure.

FIG. 4 is a flow chart that illustrates the operation of the NCE 18 to decide whether to accept the attach request in step 106 of FIG. 3 in more detail according to one embodiment of the present disclosure. As illustrated, the NCE 18 receives the attach request for attachment of the nomadic node 14 to the anchor node 12, where the attach request includes the requirements of the nomadic node 14 (step 200). Via the requirements, the attach request provides information about actual data traffic and/or service demands to the anchor node 12. The NCE 18 then determines whether the requirements of the nomadic node 14 can be fulfilled with existing transport network resources (step 202). As used herein, "existing" transport network resources are transport network resources (e.g., resources of the backhaul network 16) currently allocated for the anchor node 12 (e.g., for link(s) between the anchor node 12 and the service edge via the backhaul network 16) to which attachment is requested at the time that the NCE 18 determines whether the requirements of the nomadic node 14 can be fulfilled. In other words, in step 202, the NCE 18 determines whether the requirements of the nomadic node 14 can be fulfilled without allocating additional resources for the anchor node 12.

In one embodiment, the NCE 18 determines whether the requirements of the nomadic node 14 can be fulfilled by the global network using existing transport network resources. More specifically, in one embodiment, the NCE 18 determines whether the requirements of the nomadic node 14 can be fulfilled by the transport network from the anchor node 12 through the backhaul network 16 up to the service edge using existing transport network resources that are allocated for the anchor node 12.

In another embodiment, the NCE 18 determines whether the requirements of the nomadic node 14 can be fulfilled by the global network and/or a local network of the anchor node 12. Notably, as used herein the "global network" is the network from the anchor node 12 to the service edge, e.g. with transport network connectivity all the way to the global internet, through backhaul network 16. In contrast, the "local network" is a local network including the anchor node 12. The local network may include the capability of having a local traffic between nodes and devices beyond anchor node 12, and with optional possibility to have transport network connectivity to the global internet or not, through the backhaul network 16. Thus, global versus local networks may also be viewed as geographical distinctions, where a local network is a network that is limited to a geographical area, e.g., a geographical area served by the anchor node 12. In one embodiment, the local network of the anchor node 12 is a UDN. More specifically, in one embodiment, the NCE 18 determines whether the requirements of the nomadic node 14 can be fulfilled by either (a) the transport network from the anchor node 12 through the backhaul network 16 up to the service edge using existing transport network resources that are allocated for the anchor node 12 or (b) the local network including the anchor node 12.

If the requirements of the nomadic node 14 can be fulfilled with the existing transport network resources, then the NCE 18 sends an attach accept to the anchor node 12 (step 204). However, if the requirements of the nomadic node 14 cannot be fulfilled with the existing transport network resources allocated for the anchor node 12, then the NCE 18 attempts to allocate additional resources for the anchor node 12 (step 206). Note that the NCE 18 may attempt to allocate additional resources directly or via one or more interfaces (e.g., an interface to an optical layer). The additional resources may be, for example, increased backhaul resources, increased reliability, increased priority, and/or additional security resource(s). In one embodiment, the NCE 18 attempts to allocate any additional resources needed to fulfill the requirements of the nomadic node 14.

In one particular example, the backhaul network 16 is an all optical network (e.g., a DWDM-centric network) where traffic flows through the backhaul network 16 can be controlled or optimized by an optical layer control entity. In this example, the NCE 18 attempts to allocate additional resources for the anchor node 12 by attempting to allocate one or more additional optical wavelengths for one or more links in the communication path between the anchor node 12 and the service edge through the backhaul network 16. More specifically, in one embodiment, the NCE 18 is assigned a pool of optical wavelengths that the NCE 18 can then allocate to the anchor nodes 12 controlled by the NCE 18. The NCE 18 may then attempt to allocate additional resources for the anchor node 12 by first attempting to allocate optical wavelength(s) that the NCE 18 has not allocated to any other anchor node 12 to the anchor node 12. If there are an insufficient number of unallocated optical wavelengths to fulfill, or satisfy, the requirements of the nomadic node 14, then, in some embodiments, the NCE 18 may attempt to borrow or obtain additional optical wavelengths from another NCE 18 that can then be allocated for the anchor node 12 in order to fulfill the requirements of the nomadic node 14.

The NCE 18 determines whether the attempt to allocate additional resources sufficient to meet, or fulfill, the requirements of the nomadic node 14 was successful (step 208). If so, the NCE 18 sends an attach accept to the anchor node 12 (step 210). If not, the NCE 18 sends an attach denial to the anchor node 12 (step 212).

Figure 5:
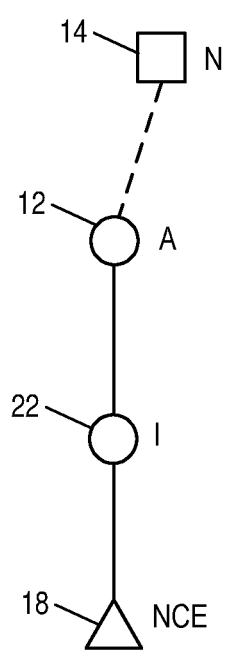
FIG. 5 illustrates one example of attachment of a nomadic node according to one embodiment of the present disclosure.

FIG. 5 illustrates one example of a nomadic node 14 (referenced here as nomadic node N) that detects the presence of an anchor node 12 (referenced here as anchor node A) and initiates an attach request according to, e.g., the process of FIG. 3. As illustrated, in this example, the anchor node A is connected to the NCE 18 via an intermediate node I. For example, the anchor node A may be a nomadic node in the attached state, and the intermediate node I may be another anchor node 12. If the attach request of the nomadic node N is accepted, then traffic from any wireless device 20 attached to the nomadic node N is routed through the anchor node A and the intermediate node I to the service edge. Here, the service edge is illustrated as being co-located with the NCE 18. The backhaul requirements from the anchor node A through the intermediate node I to the NCE 18 are increased by the attachment of the nomadic node N. If necessary, additional resources are allocated by the NCE 18 to fulfill the increased backhaul requirements.

Figure 6:
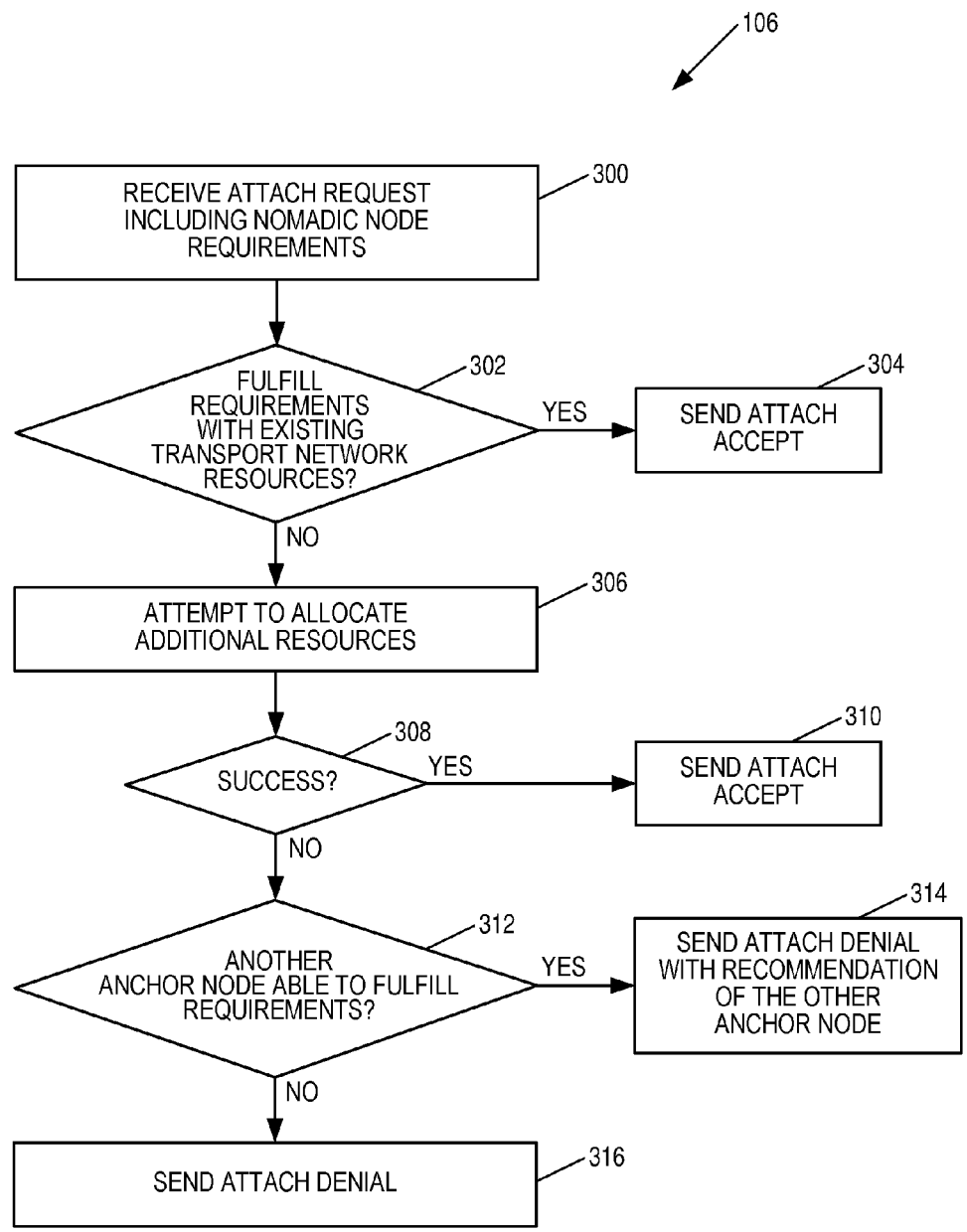
FIG. 6 illustrates a process for deciding whether to accept an attach request of a nomadic node that includes recommending a different anchor node to the nomadic node according to another embodiment of the present disclosure.

FIG. 6 is a flow chart that illustrates the operation of the NCE 18 to decide whether to accept the attach request in step 106 of FIG. 3 in more detail according to another embodiment of the present disclosure. This embodiment is similar to that of FIG. 4, but where the NCE 18 recommends another anchor node 12 to the nomadic node 14 if the attempt to allocate additional resources is not successful. More specifically, steps 300-310 are the same as steps 200-210 described above and, as such, the details are not repeated. If, in step 308, the NCE 18 determines that the attempt to allocate additional resources sufficient to fulfill the requirements of the nomadic node 14 was not successful, rather than denying the attach request, the NCE 18 determines whether there is another anchor node 12 that is able to fulfill the requirements of the nomadic node 14 (step 312). More specifically, the NCE 18 has knowledge of the network topology including the locations of the anchor nodes 12 and, in this case, the location of the nomadic node 14. In one embodiment, the NCE 18 identifies the nearest anchor node 12 that is able to fulfill the requirements of the nomadic node 14. The identified anchor node 12 may not necessarily be close enough for the nomadic node 14 to attach to that anchor node 12 at the present time. Thus, the NCE 18 may take into account the mobility of the nomadic node 14 (e.g., when and where the nomadic node 14 may move) when identifying the nearest anchor node 12 that is able to fulfill the requirements of the nomadic node 14. When identifying the nearest anchor node 12 that is capable of fulfilling, or satisfying, the requirements of the nomadic node 14, the NCE 18 may take into account the existing transport network resources and, in some embodiments, any additional resources that can be allocated.

If there is another anchor node 12 capable of fulfilling the requirements of the nomadic node 14 using existing transport network resources or, in some embodiments, additional transport network resources that can be allocated, then the NCE 18 sends an attach denial to the anchor node 12 with a recommendation for attachment to the other anchor node 12 (step 314). Otherwise, the NCE 18 sends an attach denial to the anchor node 12 (step 316). Note that, even if an attach denial is sent, a soft handshake connection between the nomadic node 14 and the anchor node 12 that sent the denial may be maintained to, e.g., assist in future attachment of the nomadic node 14 to the anchor node 12 if, e.g., existing or additional resources that can be allocated are sufficient to fulfill the requirements of the nomadic node 14.

Figure 7:
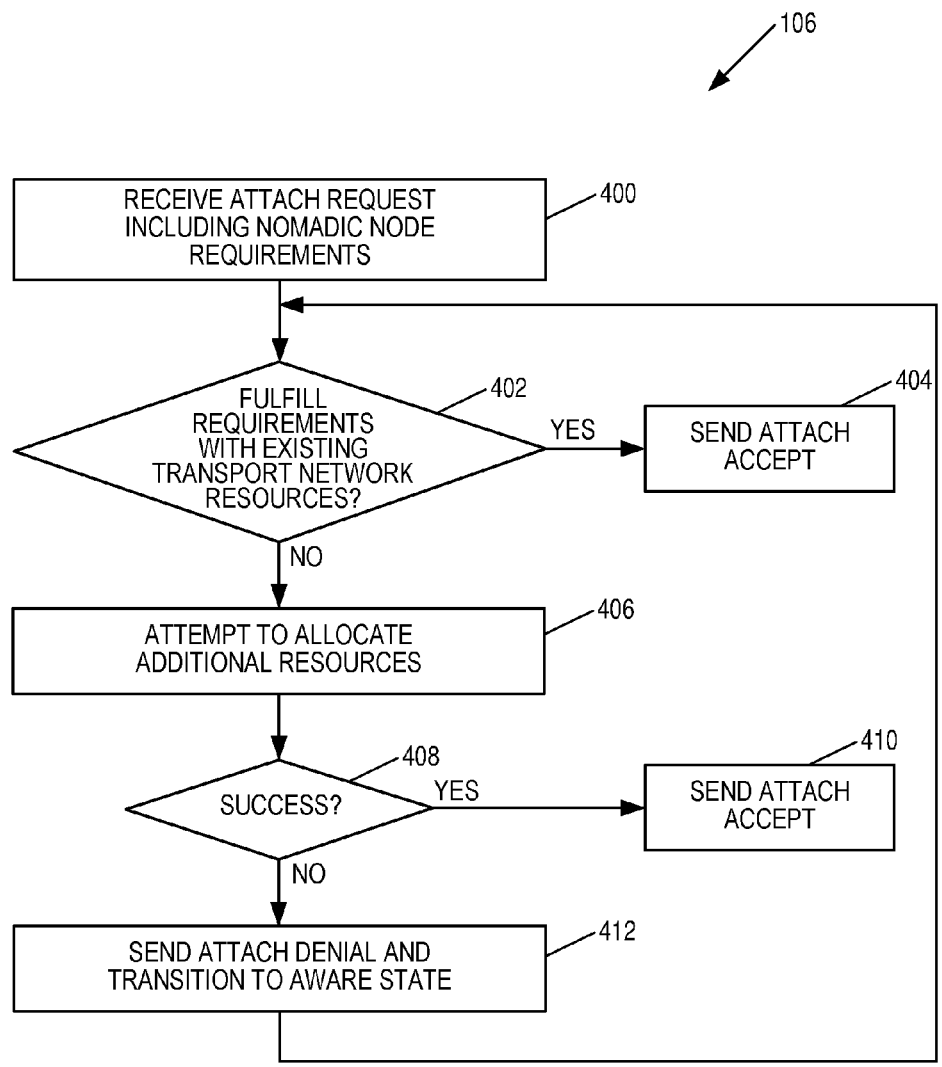
FIG. 7 illustrates a process for deciding whether to accept an attach request of a nomadic node in which an aware state is utilized to potentially accept the attach request after originally denying the attach request according to another embodiment of the present disclosure.

FIG. 7 is a flow chart that illustrates the operation of the NCE 18 to decide whether to accept the attach request in step 106 of FIG. 3 in more detail according to another embodiment of the present disclosure. This embodiment is similar to that of FIG. 4, but where the NCE 18 and the nomadic node 14 enter an "aware" state if the attempt to allocate additional resources is not successful. More specifically, steps 400-410 are the same as steps 200-210 described above and, as such, the details are not repeated. If, in step 408, the NCE 18 determines that the attempt to allocate additional resources sufficient to fulfill the requirements of the nomadic node 14 was not successful, rather than simply denying the attach request, the NCE 18 sends an attach denial and transitions the anchor node 12 and/or the nomadic node 14 to an aware state (step 412).

In the aware state, attachment is not granted when first requested. However, if backhaul resources thereafter become available, the nomadic node 14 can then be attached to the anchor node 12. More specifically, in this embodiment, the NCE 18 returns to step 402 and repeats the process to thereby monitor for a change in conditions such that the anchor node 12 is now able to fulfill the requirements of the nomadic node 14 with either the existing transport network resources or newly allocated transport network resources. When this occurs, the NCE 18 sends an attach accept (step 404 or 410). Note that step 412 may be skipped in the second and subsequent iterations of the loop (i.e., the loop formed by steps 402, 406, 408, and 412).

With regard to the aware state, in one embodiment, the anchor node 12 is placed in the aware state in which the anchor node 12 is aware of the nomadic node 14 that wants to attach to the anchor node 12. However, one can of course say that both the anchor node 12 and the nomadic node 14 are in the aware state, with different actions to be taken by the different nodes. Further, while in the embodiment of FIG. 7 the NCE 18 performs the action of monitoring conditions to determine when the attach request can be accepted, the present disclosure is not limited thereto. For example, once in the aware state, the anchor node 12 may request additional backhaul resources and wait for a decision from the NCE 18 regarding acceptance of the attach request based on, e.g., whether the additional backhaul resources can be successfully assigned or allocated for the anchor node 12. As another example, the nomadic node 14 may, when in the aware state, change its requirements and send an updated or new attach request with new requirements. For instance, when in the aware state, the nomadic node 14 may choose to relax its requirements (e.g., change a global network requirement to a local network requirement, reduce a data rate requirement, or the like) in order to obtain an attach accept.

Note that the procedures of FIGS. 6 and 7 consider input information (e.g., a recommendation to attach to another anchor node 12 (FIG. 6) or a denial with a transition to the aware state (FIG. 7)) from the network to the nomadic node 14 after one attach request. This is to be distinguished from the situation where the nomadic node 14 sends attach requests to different anchor nodes 12 while moving until the nomadic node 14 receives an attach accept for an anchor node 12 that is able to fulfill the requirements of the nomadic node 14.

Also note that steps 406-410 are optional. For example, in one alternative embodiment, the NCE 18 sends the attach denial and transitions the anchor node 12 and/or the nomadic node 14 in the aware state if the existing transport network resources are not sufficient to fulfill the requirements of the nomadic node 14. In this case, the NCE 18 may thereafter send an attach accept if the requirements of the nomadic node 14 (which may in some embodiments be reduced by the nomadic node 14 in response to the attach denial) can be fulfilled by the existing transport network resources.

Figure 8:
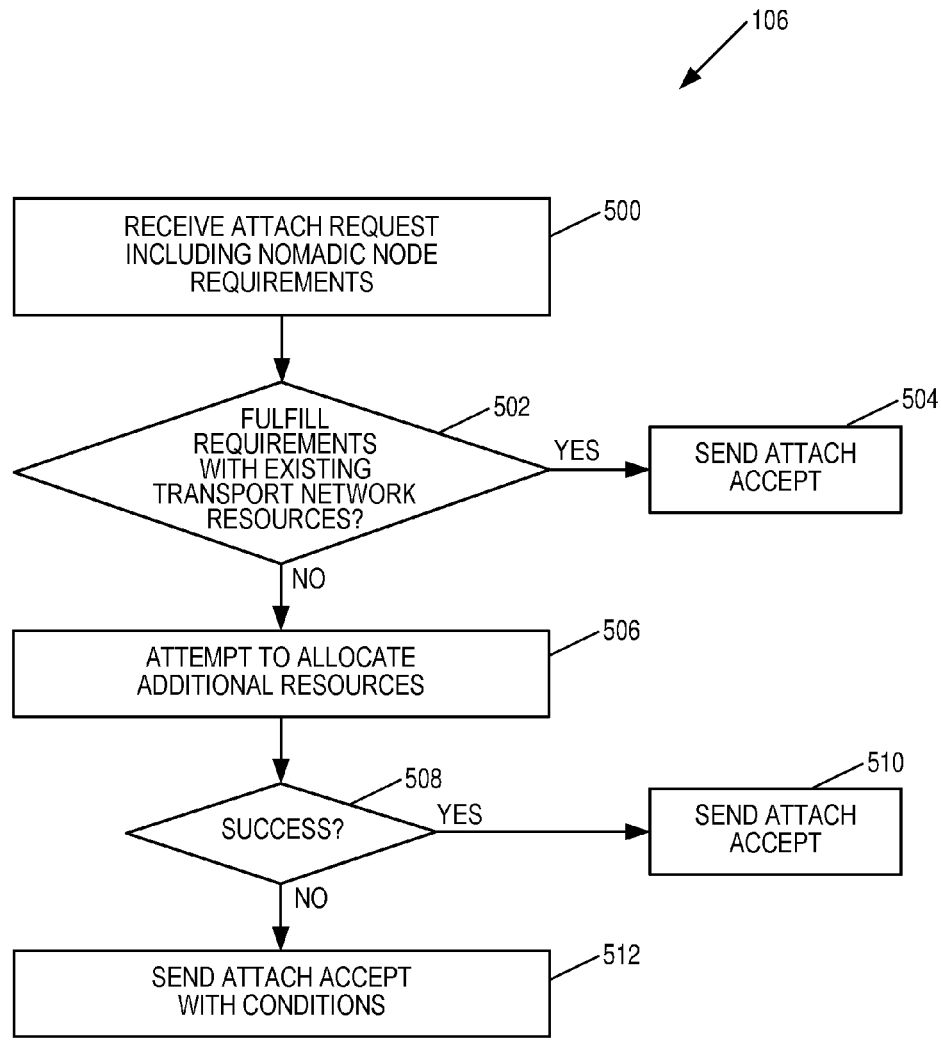
FIG. 8 illustrates a process for deciding whether to accept an attach request of a nomadic node in which an accept request may be sent with conditions according to another embodiment of the present disclosure.

FIG. 8 is a flow chart that illustrates the operation of the NCE 18 to decide whether to accept the attach request in step 106 of FIG. 3 in more detail according to another embodiment of the present disclosure. This embodiment is similar to that of FIG. 4, but where the NCE 18 accepts the attach request with conditions if the attempt to allocate additional resources is not successful. More specifically, steps 500-510 are the same as steps 200-210 described above and, as such, the details are not repeated. If, in step 508, the NCE 18 determines that the attempt to allocate additional resources sufficient to fulfill the requirements of the nomadic node 14 was not successful, rather than simply denying the attach request, the NCE 18 sends an attach accept with conditions on the acceptance (step 512).

The attach accept with conditions is an acceptance of the attach request but for reduced requirements relative to the requirements indicted in the attach request. For example, if the attach request had a requirement for attachment to the global network, the attach accept with conditions may indicate that the attach request is accepted but only for the local network. In a similar manner, the conditions may indicate, for example, one or more of: a reduced data rate relative to the requested data rate, a reduced attach time relative to the expected attach time, an increased delay relative to the delay requirement, etc. While not illustrated, the nomadic node 14 may either accept the conditions, in which case the nomadic node 14 proceeds with attachment to the anchor node 12, or may reject the conditions, in which case the nomadic node 14 initiates an attachment procedure with another anchor node 12, if available. Note that steps 506-510 are optional. For example, in one alternative embodiment, the NCE 18 sends the attach accept with conditions if the existing transport network resources are not sufficient to fulfill the requirements of the nomadic node 14.

In one embodiment of the process of FIG. 8, if traffic classes are differentiated, then the nomadic node 14 can request some traffic class (data rate, delay, etc.) but be granted something else (e.g., via the attach accept with condition(s)). This is a negotiation between the nomadic node 14 and the NCE 18. The nomadic node 14 can either request specific values or distributions, or a best effort. The NCE 18 evaluates available resources (e.g., backhaul resources) and either grants attachment according to the request, offers a different level (e.g., via the attach accept with condition(s)) which then the nomadic node 14 may choose to accept or deny, or just not grant access. In the case a lower service level is proposed by the NCE 18, the nomadic node 14 may either accept the lower service level or initiate an attachment procedure with another anchor node 12 if such is available.

Figure 9:
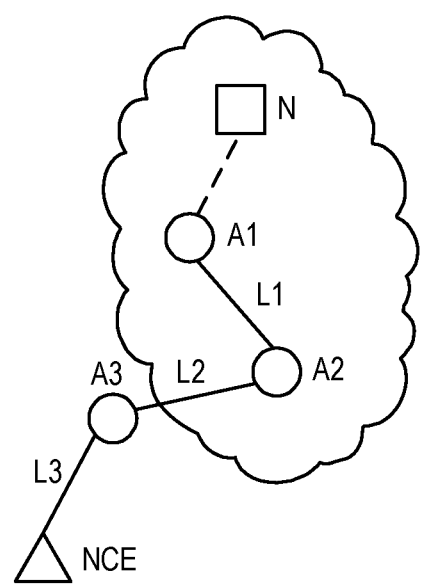
FIG. 9 illustrates one example of an attachment with conditions according to one embodiment of the present disclosure.

FIG. 9 illustrates one example of an attachment of a nomadic node 14 (referenced here as nomadic node N) to an anchor node 12 (referenced here as anchor node A1) with conditions according to one embodiment of the present disclosure. In this example, the nomadic node N sends an attach request to the anchor node A1. The anchor node A1 is connected to another anchor node A2 via a link L1, and the anchor node A2 is connected to yet another anchor node A3 via a link L2. The anchor node A3 is connected to the service edge, which in this example is co-located with the NCE 18, via a link L3 through the backhaul network 16 (not shown). In this example, no further transport network resources can be allocated to the link L2 between the anchor node A2 and the anchor node A3 and, as such, the requirements of the nomadic node N cannot be fulfilled. As a result, the NCE 18 decides that the nomadic node N cannot be attached to the global network (i.e., through the transport network all the way to the service edge, which in this example is the NCE 18), but decides that the nomadic node N can be attached to a local network including the anchor nodes A1 and A2, where this local network may be, for example, a UDN. In FIG. 9, the local network is illustrated by the cloud around the anchor nodes A1 and A2. Therefore, the NCE 18 sends an attach accept with the condition that the acceptance is only for the local network. Assuming that the nomadic node N agrees to the conditions and proceeds with attachment to the anchor node A1, then the wireless devices 20 (not shown) attached to the nomadic node N have access to the local network. Further, in some embodiments, if the traffic load from the nomadic node N does not exceed the capabilities of the link L2, then some traffic can reach the global network but this cannot be guaranteed (i.e., assured). Hence the attach request is accepted with conditions. Note that wireless devices 20 (not shown) camping on the anchor nodes A1, A2, and A3 experience global connectivity.

Figure 10:
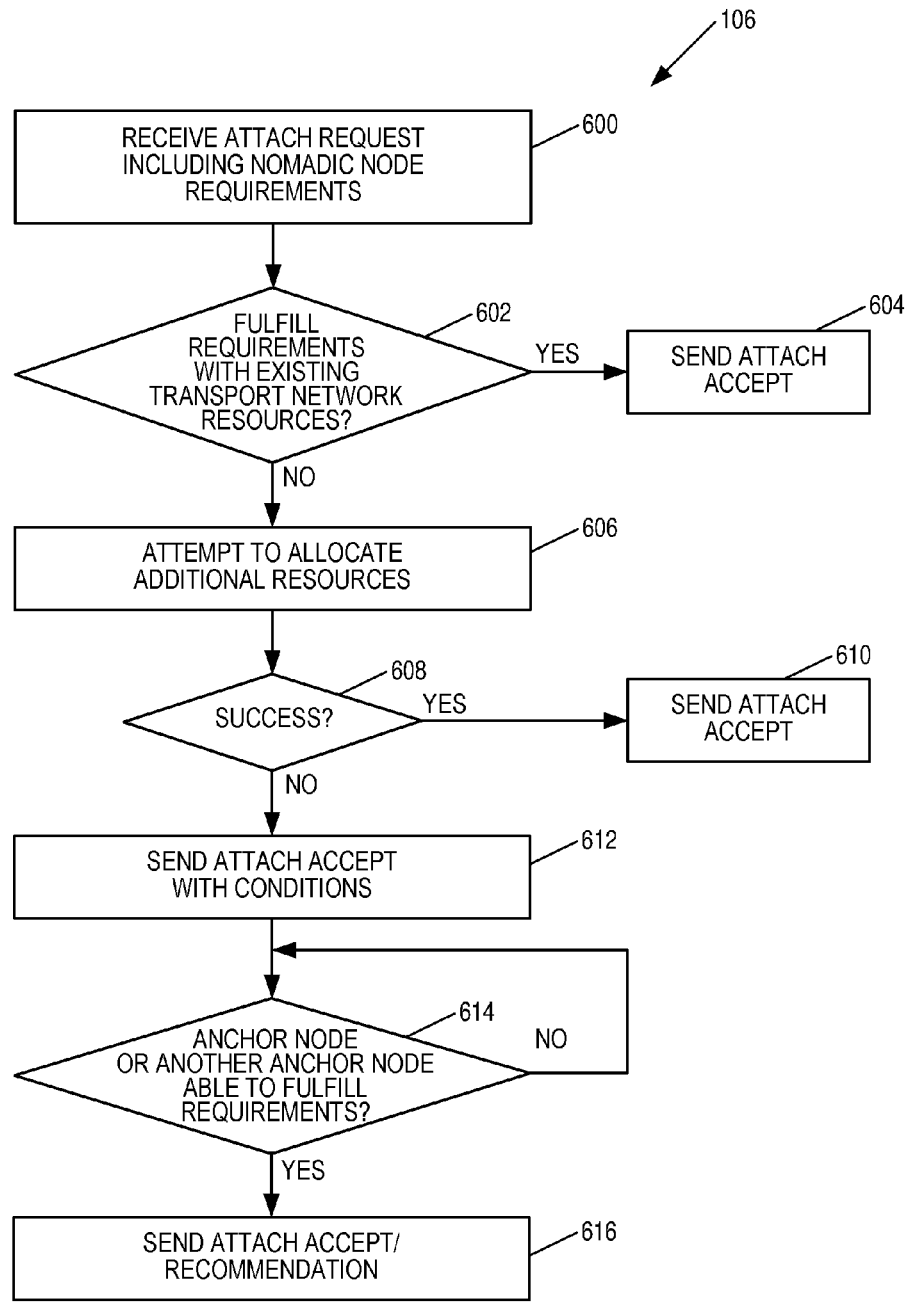
FIG. 10 illustrates a process for deciding whether to accept an attach request of a nomadic node in which an accept request may be sent with conditions according to yet another embodiment of the present disclosure.

FIG. 10 is a flow chart that illustrates the operation of the NCE 18 to decide whether to accept the attach request in step 106 of FIG. 3 in more detail according to another embodiment of the present disclosure. This embodiment is similar to that of FIG. 8. As illustrated, steps 600-612 are the same as steps 500-512 described above and, as such, the details are not repeated. However, after sending the attach accept with conditions, the NCE 18 searches for an anchor node 12 that is capable of fulfilling the requirements (i.e., the full or complete requirements) of the nomadic node 14 (step 614). The search may consider other anchor nodes 12 that are available to or near the nomadic node 14 or both the anchor node 12 subject to the original attach request as well as other anchor nodes 12 that are available to or near the nomadic node 14. Further, the search may consider the existing transport network resources of the anchor nodes 12 and, in some embodiments, any available transport network resources that can be allocated to the anchor nodes 12.

If an anchor node 12 that can fulfill the requirements of the nomadic node 14 is found, the NCE 18 sends either an attach accept or attach recommendation (step 616). For example, an attach request may be sent if the anchor node 12 found in the search of step 614 is the original anchor node 12 for the attach request. Conversely, if the anchor node 12 found in the search of step 614 is not the original anchor node 12 for the attach request, then the NCE 18 may send an attach recommendation to recommend attachment of the nomadic node 14 to the other anchor node 12. The attach recommendation is a suggestion for the nomadic node 14 to attach to the other anchor node 12.

Figure 11:
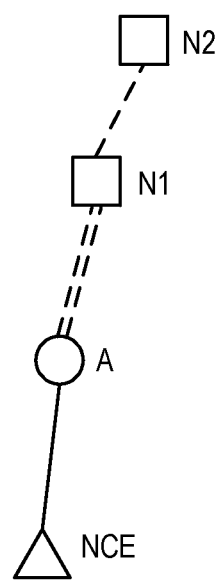
FIG. 11 illustrates one example of an attachment of a nomadic node to another nomadic node that is in an attached state according to one embodiment of the present disclosure.

As discussed above, in some embodiments, a nomadic node 14 in the attached state can operate as an anchor node 12 for another nomadic node 14. One example of such as scenario is illustrated in FIG. 11. In the example of FIG. 11, a nomadic node 14 (referenced here as N2) sends an attach request to another nomadic node 14 (referenced here as N1) that is in the attached state. In particular, the nomadic node N1 is attached to an anchor node 12 (referenced here as anchor node A). If the nomadic node N2 is attached to the nomadic node N1, the transport network resources may need to be updated, as discussed above.

One issue that may arise when one nomadic node 14 serves as an anchor node 12 for another nomadic node 14 is that the nomadic node 14 serving as the anchor node 12 may move. Thus, using FIG. 11 again as an example, in some embodiments, backhaul adaptation may include procedures, e.g., preplanned alternate backhaul routes, for the case when the nomadic node N1 de-attaches from the network while the nomadic node N2 still wants to be attached. A preplanned alternate backhaul route may, for example, indicate another anchor node (e.g., anchor node A) to which the nomadic node N2 is to attach if the nomadic node N1 de-attaches from the anchor node A.

Figure 12:
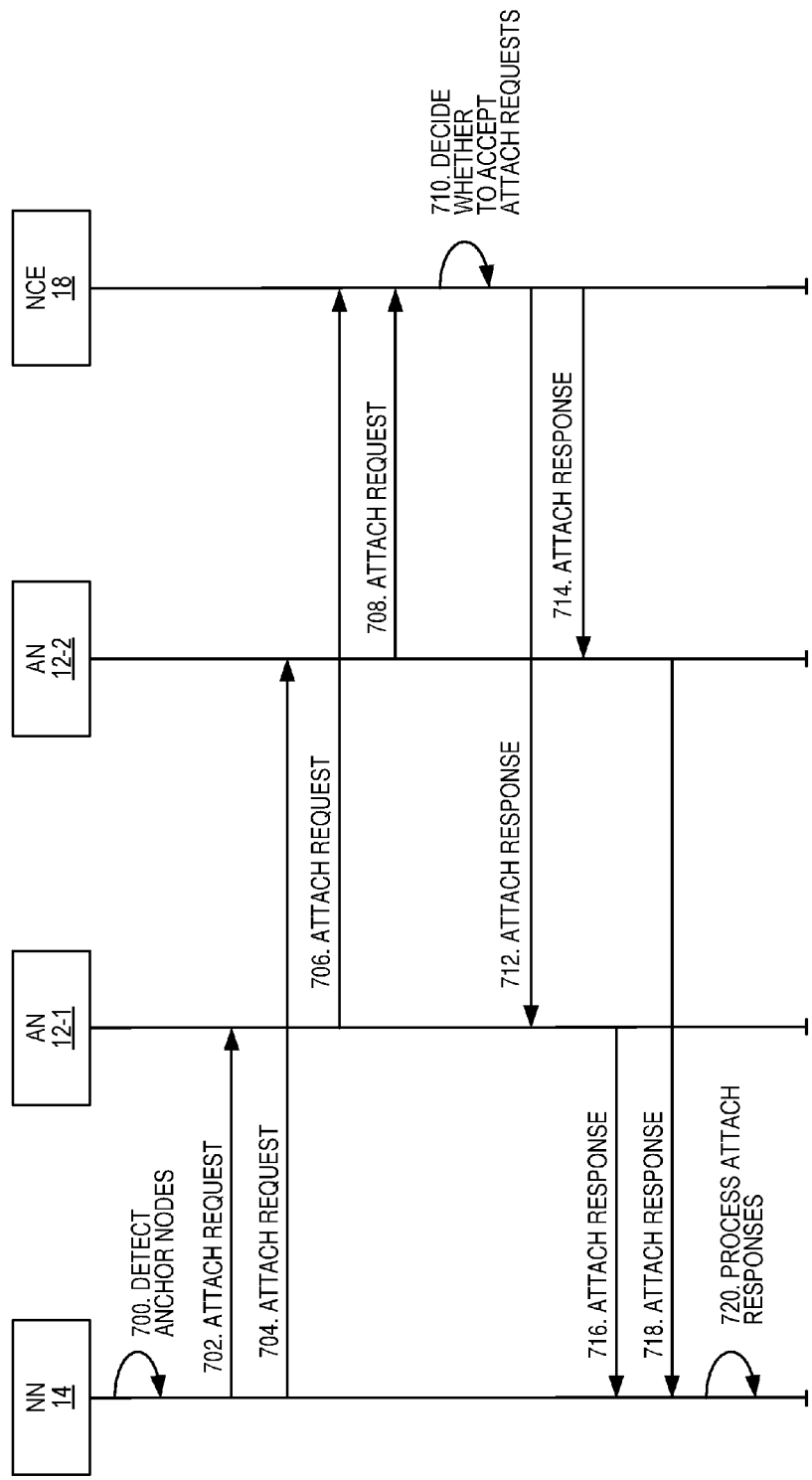
FIG. 12 illustrates an attachment procedure for a nomadic node in which the nomadic node sends simultaneous attach requests to multiple anchor nodes according to one embodiment of the present disclosure.

Thus far, the discussion has focused on embodiments where the nomadic node 14 sends an attach request to a single anchor node 12. However, in other embodiments, the nomadic node 14 may send multiple simultaneous attach requests to different anchor nodes 12. In this regard, FIG. 12 illustrates an attachment procedure in which the nomadic node 14 sends multiple simultaneous attach requests according to one embodiment of the present disclosure. As illustrated, the nomadic node 14 detects the anchor nodes 12-1 and 12-2 (step 700). Again, the nomadic node 14 may detect the anchor nodes 12-1 and 12-2 using any suitable technique. Note that while the nomadic node 14 detects two anchor nodes 12 in this example, the process applies to any number of two or more detected anchor nodes 12.

After detecting the anchor nodes 12-1 and 12-2, the nomadic node 14 sends nomadic node attach, or attachment, requests to the anchor nodes 12-1 and 12-2 (steps 702 and 704). The attach requests are referred to as being simultaneous. However, as used herein, the term "simultaneous attach requests" is not to be construed as the attach requests being sent at exactly the same time. Rather, the attach requests are simultaneous in that an attach response is not received for any of the attach requests before the other attach requests are sent. As discussed above, the attach requests include information indicative of one or more requirements of the nomadic node 14. Further, in this embodiment, the attach requests also include a nomadic node identifier of the nomadic node 14 (e.g., a nomadic node identification number). As discussed below, the nomadic node identifier enables the NCE 18 to determine that the attach requests originate from the same nomadic node 14.

The anchor nodes 12-1 and 12-2 forward, or redirect, the attach requests to the NCE 18 (steps 706 and 708). The NCE 18 then decides whether to accept the attach requests (step 710). In one embodiment, the NCE 18 utilizes any of the embodiments described herein to decide whether to accept, accept with conditions, or deny each of the attach requests. However, using the nomadic node identifier in the attach requests, the NCE 18 can determine that the attach requests originate from the same nomadic node 14 and then use this knowledge to correctly compute backhaul load. After making the decision, the NCE 18 sends corresponding attach responses to the anchor nodes 12-1 and 12-2, which in turn forward, or redirect, the attach responses to the nomadic node 14 (steps 712 through 718). Each attach response may be an attach accept, an attach deny, or, in some embodiments, an attach accept with conditions.

The nomadic node 14 processes the attach responses (step 720). In general, if only one attach accept is received, then the nomadic node 14 attaches to the corresponding anchor node 12. However, if attach accepts (with or without conditions) are received from both of the anchor nodes 12-1 and 12-2, then the nomadic node 14 selects one of the anchor node 12-1 and 12-2 to which to attach. This selection may be a random selection or a selection based on any suitable metric (e.g., minimum backhaul delay, even backhaul load distribution, even spare backhaul capacity distribution, or the like). For example, if the attach accept for the anchor node 12-1 is without conditions but the attach accept for the anchor node 12-2 is with conditions, then the nomadic node 14 may select to attach to the anchor node 12-1.

Figure 13:
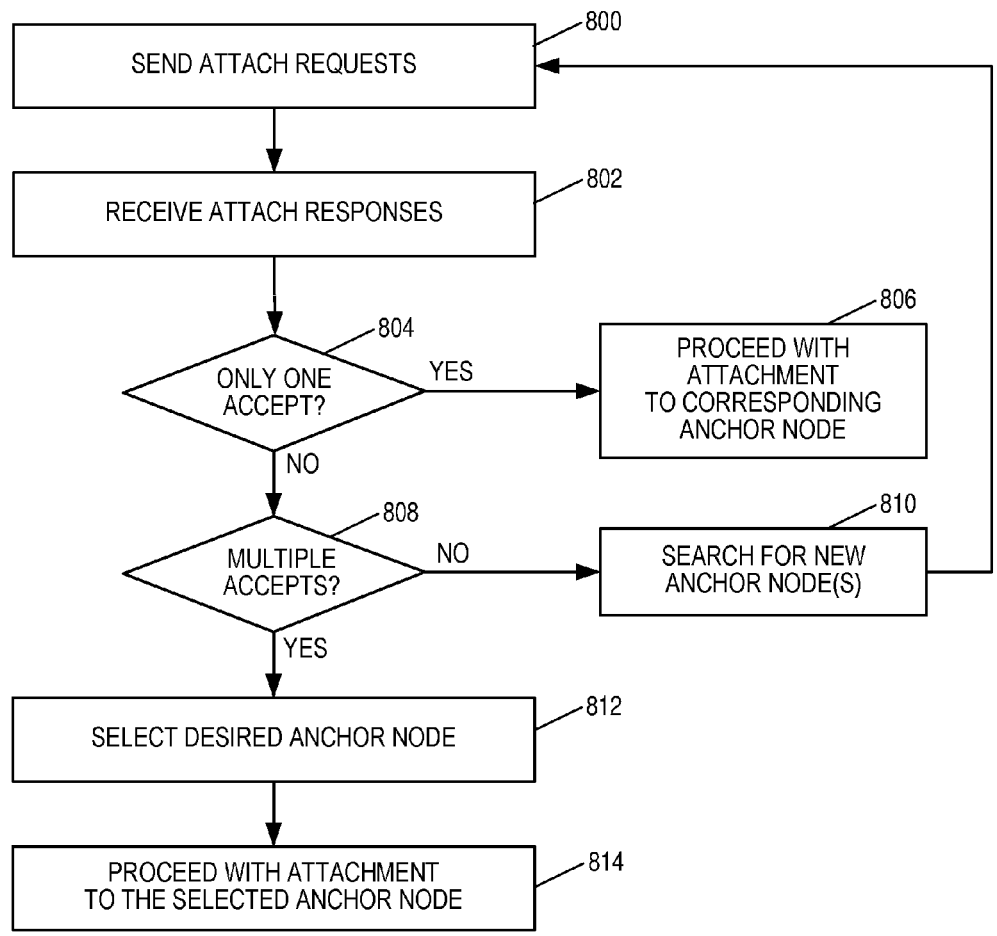
FIG. 13 illustrates the operation of a nomadic node according to one embodiment of the present disclosure.

FIG. 13 is a flow chart that illustrates the operation of the nomadic node 14 according to one embodiment of the present disclosure. As illustrated, the nomadic node 14 (after detecting multiple anchor nodes 12) sends simultaneous attach requests to the detected anchor nodes 12 (step 800). In response, the nomadic node 14 receives attach responses from the anchor nodes 12 (step 802). The nomadic node 14 determines whether only one of the attach responses is an attach accept (step 804). If so, the nomadic node 14 proceeds with attachment to the anchor node 12 from which the attach accept was received (step 806). If the number of attach accepts received is zero or more than one, the nomadic node 14 determines whether multiple attach accepts were received (step 808). If not (i.e., if there are no attach accepts), then the nomadic node 14 searches for new anchor node(s) 12 (step 810), and the process then returns to step 800. Returning to step 808, if multiple attach accepts are received, then the nomadic node 14 selects a desired anchor node 12 from the set of anchor nodes 12 from which attach accepts were received (step 812). As discussed above, this selection may be performed randomly or based on any suitable metric. The nomadic node 14 then proceeds to attach to the selected anchor node 12 (step 814).

Figure 14:
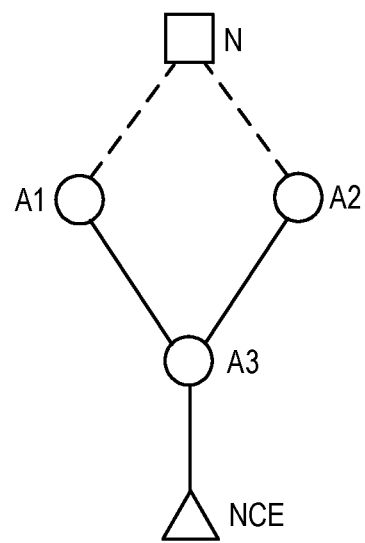
FIG. 14 illustrates one example of a nomadic node sending multiple simultaneous attach requests according to one embodiment of the present disclosure.

FIG. 14 illustrates one example in which a nomadic node 14 (referenced as nomadic node N) sends multiple simultaneous attach requests according to one embodiment of the present disclosure. In this example, the nomadic node N sends simultaneous attach requests to anchor nodes 12 (referenced as anchor nodes A1 and A2). The anchor nodes A1 and A2 are themselves attached to another anchor node 12 (referenced as anchor node A3). The NCE 18 is aware that the attach requests to attach to the anchor nodes A1 and A2 both originate from the same nomadic node N. As such, the NCE 18 can utilize this knowledge when computing the required backhaul resources over the link between the NCE 18 and the anchor node A3 based on the requirements of the nomadic node N indicated by the attach requests. If the NCE 18 was not aware that the attach requests came from the same nomadic node N, then the NCE 18 may incorrectly compute the required backhaul resources for the nomadic node N since both of the anchor nodes A1 and A2 utilize the link between the anchor node A3 and the NCE 18 but the nomadic node N will only attach to one of the anchor nodes A1 or A2.

Figure 15:
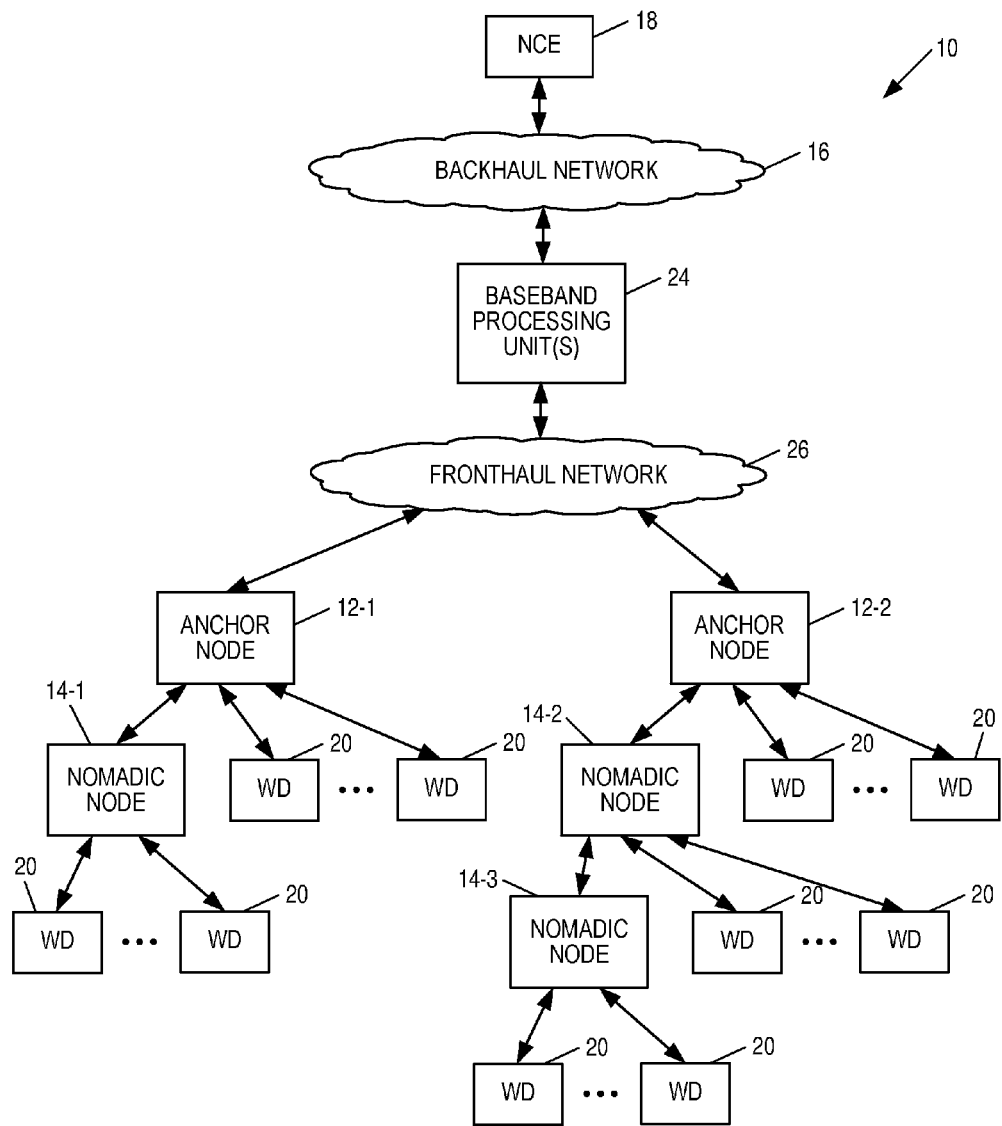
FIG. 15 illustrates a cellular communications system that includes a Centralized or Cloud Radio Access Network (C-RAN) architecture enabling attachment and dynamic transport network assignment for nomadic nodes according to one embodiment of the present disclosure.

As mentioned above, the architecture of the cellular communications network 10 of FIG. 1 is only an example. In this regard, FIG. 15 illustrates the cellular communications network 10 according to another embodiment of the present disclosure. In this embodiment, a C-RAN architecture is utilized. In particular, the anchor nodes 12 are RRHs or similar radio access nodes, and baseband processing for the anchor nodes 12, or at least some of the anchor nodes 12, is centralized at one or more baseband processing units 24. The anchor nodes 12 are coupled to the baseband processing unit(s) 24 via a fronthaul network 26. The fronthaul network 26 may be a wired network or a wireless network. Notably, the fronthaul network 26 and the backhaul network 16 are generally referred to herein as the transport network. The operation of the cellular communications network 10 with regard to nomadic node attachment and dynamic transport network resource allocation is the same as that described in the embodiments above.

In addition to the nomadic node attachment procedures described above, systems and methods for handling dynamic backhaul/fronthaul requirements for, e.g., a moving network are provided. The backhaul and/or fronthaul requirements depend on the current topology of the network and the network load. The topology of the network depends on the number of attached nomadic nodes 14 and size of any attached UDNs, in addition to the normal variations of the RAN topology. The traffic load depends on the topology and number of wireless devices 20 attached to the network. When the backhaul and/or fronthaul requirements change, e.g., by nomadic nodes 14 attaching to the network as described above, the backhaul resources are adapted if the existing transport network resources (e.g., transport network resources that were planned or dimensioned during deployment) cannot fulfill the transport requirements of the nomadic nodes 14.

The NCE 18 is aware of the (local) backhaul information and can adapt the resources allocated to each network node. In the case of a DWDM-centric transport solution, the lambda controller, which determines which and how many wavelengths are used to carry traffic to a specific network node, can be used to adapt the backhaul resources.

Figure 16:
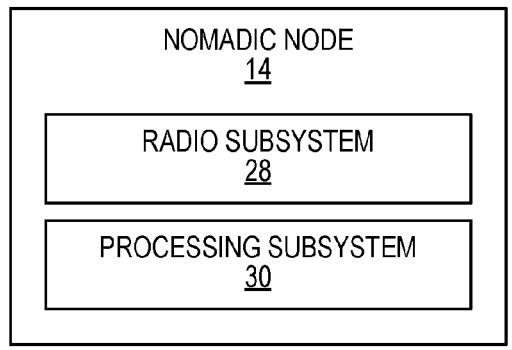
FIG. 16 is a block diagram of one embodiment of a nomadic node.

FIG. 16 is a block diagram of a nomadic node 14 according to one embodiment of the present disclosure. As illustrated, the nomadic node 14 includes a radio subsystem 28 and a processing subsystem 30. The radio subsystem 28 generally includes analog and, in some embodiments, digital components for wirelessly sending and receiving messages to and from other nodes (e.g., anchor nodes 12). In particular embodiments, the radio subsystem 28 may represent or include Radio Frequency (RF) transceivers, or separate RF transmitters and receivers, capable of transmitting messages and/or other suitable information wirelessly to other nodes.

The processing subsystem 30 generally operates to control the nomadic node 14 as described herein. In particular embodiments, the processing subsystem 30 may comprise, for example, one or several general-purpose or special-purpose microprocessors or other microcontrollers programmed with suitable software and/or firmware to carry out some or all of the functionality of the nomadic node 14 described herein. In addition or alternatively, the processing subsystem 30 may comprise various digital hardware blocks (e.g., one or more Application Specific Integrated Circuits (ASICs), one or more off-the-shelf digital and analog hardware components, or a combination thereof) configured to carry out some or all of the functionality of the nomadic node 14 described herein. Additionally, in particular embodiments, the above described functionality of the nomadic node 14 may be implemented, in whole or in part, by the processing subsystem 30 executing software or other instructions stored on a non-transitory computer-readable medium, such as Random Access Memory (RAM), Read Only Memory (ROM), a magnetic storage device, an optical storage device, or any other suitable type of data storage components.

Figure 17:
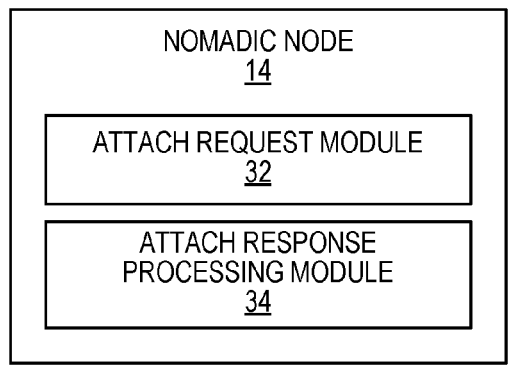
FIG. 17 is a block diagram of another embodiment of a nomadic node.

FIG. 17 is a block diagram of a nomadic node 14 according to another embodiment of the present disclosure. In this embodiment, the nomadic node 14 includes an attach request module 32 and an attach response processing module 34, each of which is implemented in software. The attach request module 32 operates to send an attach request(s) according to any of the embodiments described above. The attach response processing module 34 then processes the attach response(s) according to any of the embodiments described above.

Note that the nomadic node 14 may generally operate according to any of the embodiments described herein. Further, in some embodiments, a computer program is provided, where the computer program comprises instructions which, when executed on at least one processor, cause the at least one processor to carry out the functionality of the nomadic node 14 according to any of the embodiments described herein. Further, in one embodiment, a carrier containing this computer program is provided, where the carrier is an electronic signal, an optical signal, a radio signal, or a computer readable storage medium (e.g., a non-transitory computer readable medium).

Figure 18:
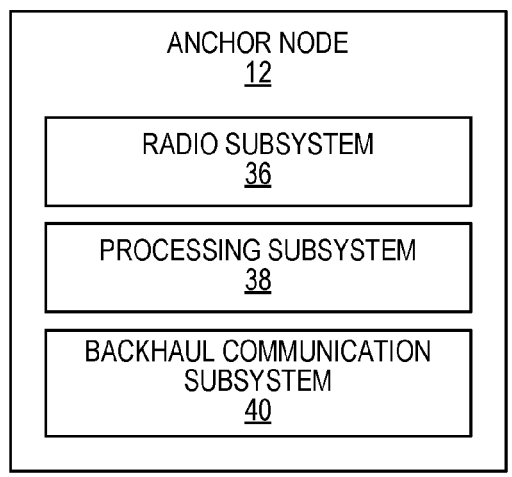
FIG. 18 is a block diagram of one embodiment of an anchor node.

FIG. 18 is a block diagram of an anchor node 12 according to one embodiment of the present disclosure. As illustrated, the anchor node 12 includes a radio subsystem 36 and a processing subsystem 38. The radio subsystem 36 generally includes analog and, in some embodiments, digital components for wirelessly sending and receiving messages to and from other nodes (e.g., nomadic nodes 14). In particular embodiments, the radio subsystem 36 may represent or include RF transceivers, or separate RF transmitters and receivers, capable of transmitting messages and/or other suitable information wirelessly to other nodes.

The processing subsystem 38 generally operates to control the anchor node 12 as described herein. In particular embodiments, the processing subsystem 38 may comprise, for example, one or several general-purpose or special-purpose microprocessors or other microcontrollers programmed with suitable software and/or firmware to carry out some or all of the functionality of the anchor node 12 described herein. In addition or alternatively, the processing subsystem 38 may comprise various digital hardware blocks (e.g., one or more ASICs, one or more off-the-shelf digital and analog hardware components, or a combination thereof) configured to carry out some or all of the functionality of the anchor node 12 described herein. Additionally, in particular embodiments, the above described functionality of the anchor node 12 may be implemented, in whole or in part, by the processing subsystem 38 executing software or other instructions stored on a non-transitory computer-readable medium, such as RAM, ROM, a magnetic storage device, an optical storage device, or any other suitable type of data storage components.

In addition, the anchor node 12 includes a backhaul communication subsystem 40 (or more generally a transport network communication subsystem) that generally includes hardware or a combination of hardware and software that enables the anchor node 12 to communicate with other network nodes (e.g., other anchor nodes 12) over the backhaul network 16 (or more generally the transport network).

Figure 19:
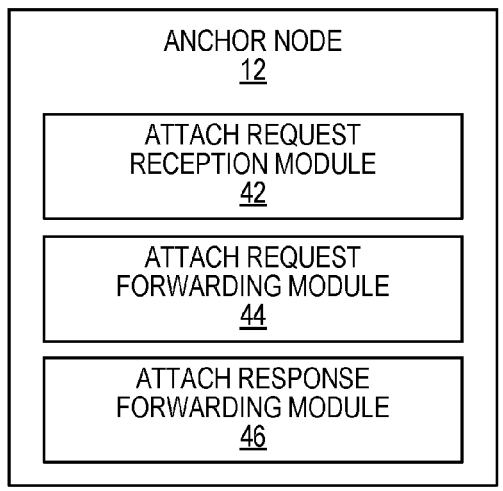
FIG. 19 is a block diagram of another embodiment of an anchor node.

FIG. 19 is a block diagram of an anchor node 12 according to another embodiment of the present disclosure. In this embodiment, the anchor node 12 includes an attach request reception module 42, an attach request forwarding module 44, and an attach response forwarding module 46, each of which is implemented in software. The attach request reception module 42 operates to receive an attach request from a nomadic node 14. The attach request forwarding module 44 then forwards the attach request to the NCE 18. Thereafter, the attach response forwarding module 46 receives an attach response from the NCE 18 and forwards the attach response to the nomadic node 14.

Note that the anchor node 12 may generally operate according to any of the embodiments described herein. Further, in some embodiments, a computer program is provided, where the computer program comprises instructions which, when executed on at least one processor, cause the at least one processor to carry out the functionality of the anchor node 12 according to any of the embodiments described herein. Further, in one embodiment, a carrier containing this computer program is provided, where the carrier is an electronic signal, an optical signal, a radio signal, or a computer readable storage medium (e.g., a non-transitory computer readable medium).

Figure 20:
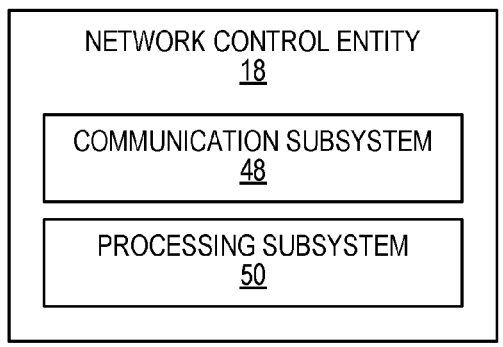
FIG. 20 is a block diagram of one embodiment of network control entity.

FIG. 20 is block diagram of the NCE 18 according to one embodiment of the present disclosure. As illustrated, the NCE 18 includes a communication subsystem 48 and a processing subsystem 50. The communication subsystem 48 generally includes hardware or a combination of hardware and software that enables the NCE 18 to communicate with other network nodes (e.g., anchor nodes 12) via the backhaul network 16. The processing subsystem 50 generally operates to control the NCE 18 as described herein. In particular embodiments, the processing subsystem 50 may comprise, for example, one or several general-purpose or special-purpose microprocessors or other microcontrollers programmed with suitable software and/or firmware to carry out some or all of the functionality of the NCE 18 described herein. In addition or alternatively, the processing subsystem 50 may comprise various digital hardware blocks (e.g., one or more ASICs, one or more off-the-shelf digital and analog hardware components, or a combination thereof) configured to carry out some or all of the functionality of the NCE 18 described herein. Additionally, in particular embodiments, the above described functionality of the NCE 18 may be implemented, in whole or in part, by the processing subsystem 50 executing software or other instructions stored on a non-transitory computer-readable medium, such as RAM, ROM, a magnetic storage device, an optical storage device, or any other suitable type of data storage components.

Figure 21:
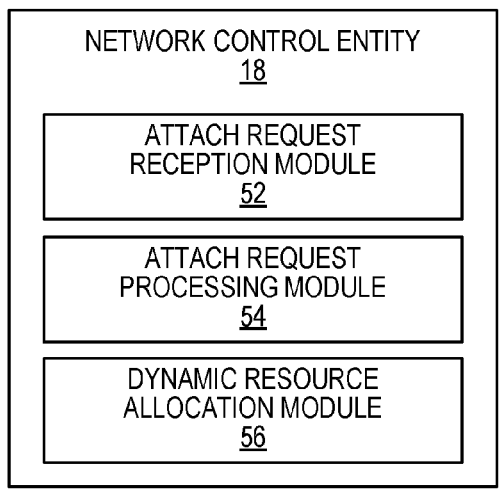
FIG. 21 is a block diagram of another embodiment of a network control entity.

FIG. 21 is a block diagram of the NCE 18 according to another embodiment of the present disclosure. In this embodiment, the NCE 18 includes an attach request reception module 52, an attach request processing module 54, and a dynamic resource allocation module 56, each of which is implemented in software. The attach request reception module 52 operates to receive an attach request from an anchor node 12. The attach request processing module 54 then processes the attach request to decide whether to accept the request, deny the request, or, in some embodiments, accept the request with conditions. The attach request processing module 54 sends the appropriate attach response to the anchor node 12. The dynamic resource allocation module 56 operates to dynamically allocate transport network resources, as discussed above.

Note that the NCE 18 may generally be implemented in any suitable network node, where the network node operates to provide the functionality of the NCE 18 according to any of the embodiments described herein. Further, in some embodiments, a computer program is provided, where the computer program comprises instructions which, when executed on at least one processor, cause the at least one processor to carry out the functionality of the NCE 18 according to any of the embodiments described herein. Further, in one embodiment, a carrier containing this computer program is provided, where the carrier is an electronic signal, an optical signal, a radio signal, or a computer readable storage medium (e.g., a non-transitory computer readable medium).

Figure 22:
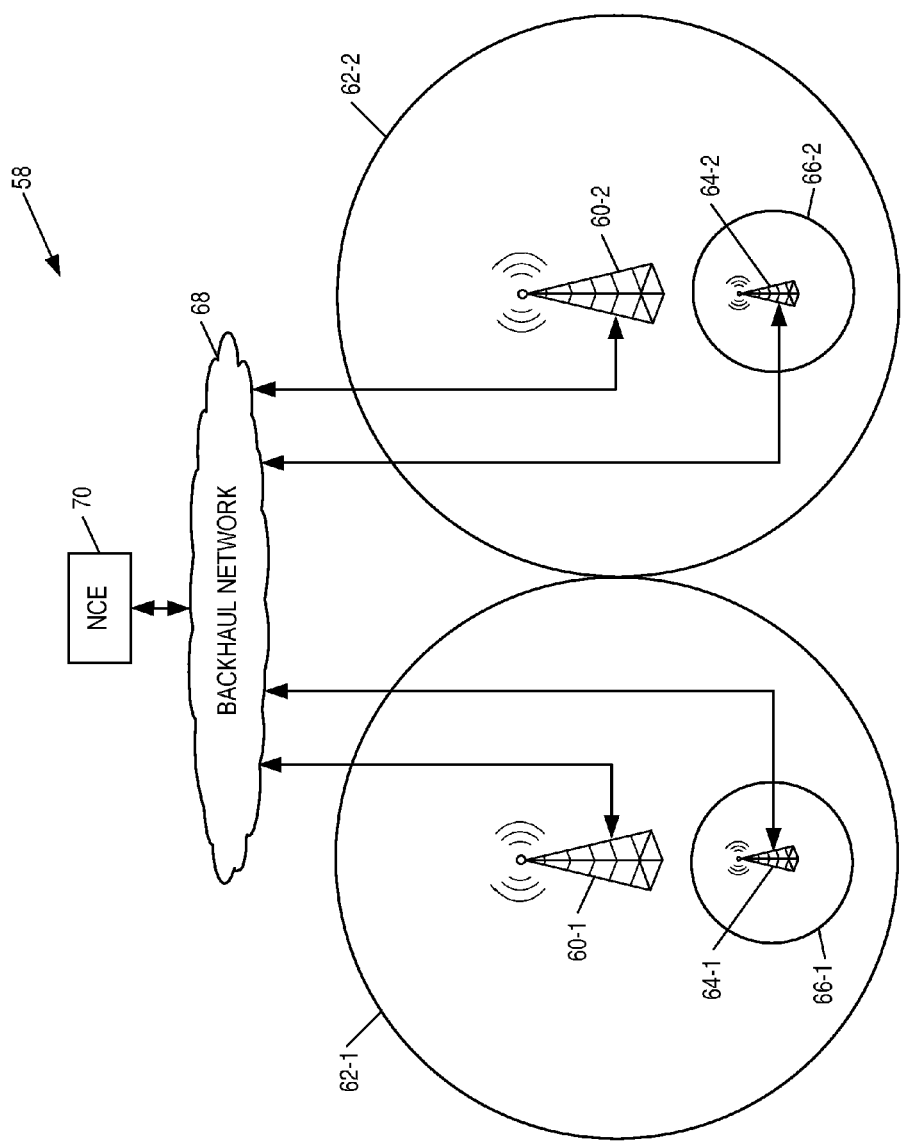
FIG. 22 illustrates a cellular communications system that includes a heterogeneous RAN architecture enabling low power base stations to be powered on and off together with dynamic transport network assignment according to one embodiment of the present disclosure.

The embodiments described above have focused on attachment and dynamic transport network resource allocation with respect to the nomadic nodes 14 in a moving network. However, the concepts disclosed herein are also applicable to, e.g., a heterogeneous network deployment in which small cell, or low power, base stations are powered on or off depending on, e.g., capacity needs. In this regard, FIG. 22 illustrates one example of a cellular communications network 58 including a heterogeneous RAN according to one embodiment of the present disclosure. The heterogeneous RAN includes large cell, or high power, base stations 60-1 and 60-2, which are also referred to herein as macro base stations 60-1 and 60-2. The macro base stations 60-1 and 60-2 are more generally referred to herein collectively as macro base stations 60 and individually as macro base station 60. The macro base stations 60 may be, for example, eNBs. The macro base stations 60-1 and 60-2 serve corresponding macro cells 62-1 and 62-2 (generally referred to herein collectively as macro cells 62 and individually as macro cell 62). The heterogeneous RAN also includes a number of small cell, or low power, base stations 64-1 and 64-2 (generally referred to herein collectively as low power base stations 64 and individually as low power base station 64). The low power base stations 64-1 and 64-2 serve corresponding small cells 66-1 and 66-2 (generally referred to herein collectively as small cells 66 and individually as small cell 66). The low power base stations 64 may be, for example, micro base stations, pico base stations, femto base stations, home base stations (e.g., home eNBs), or the like. Note that while the term low power base station 64 is used herein, the low power base stations 64 may be any type of radio access node (e.g., a remote radio head).

The macro base stations 60 and the low power base stations 64 are connected to a backhaul network 68 (or more generally a transport network). Note that a C-RAN architecture may alternatively be used in which, e.g., the low power base stations 64 are low power RRHs that are connected to a centralized control unit(s) via a fronthaul network. A NCE 70 is connected to the backhaul network 68 and operates to, e.g., dynamically adapt allocation of transport network resources in response to turning the low power base stations 64 on and off.

Note that while only two macro base stations 60 and two low power base stations 64 are illustrated in FIG. 22, the cellular communications network 58 may include many macro base stations 60 and/or many low power base stations 64. When there are many small cells 66, statistically speaking, many of the small cells 66, and in some cases most of the small cells 66, will be empty most of the time. For energy saving and interference reduction reasons, low power base stations 64 that do not carry traffic may be turned off. When the traffic load in an area increases, sleeping low power base stations 64 are activated. When there is a plethora of low power base stations 64 to choose from in an area, the concepts described herein may be used to decide which low power base stations 64 to activate based on available backhaul resources.

In operation, the low power base stations 64 may be powered off to save energy when traffic demands are low. However, in this case, turning the low power base stations 64 on changes the requirements on the backhaul network 68. The NCE 70 may, with a (many) small cell 66 in sleep mode, determine if a small cell 66 should be turned on or which of a set of small cells 66 should be turned on. For example, before turning a low power base station 64 on, the NCE 70 may determine whether existing transport network resources allocated to the low power base station 64 are able to fulfill the requirements of the low power base station 64 or if additional transport network resources can be allocated for the low power base station 64 to fulfill the requirements of the low power base station 64 using any one of the embodiments described above. If so, the NCE 70 may then turn on the low power base station 64. Otherwise, the NCE 70 may keep the low power base station 64 in the off or sleep state or allow the low power base station 64 to turn on but with conditions.

The systems and methods described herein provide numerous benefits and advantages. While not being limited to or by any particular benefit or advantage, some examples are given below. In one embodiment, systems and methods disclosed herein provide a solution to the problem of nomadic node network attachment, especially in cases that the addition of new nodes in the existing network can be limited by the deployed backhaul traffic dimensioning or available functionalities. In some embodiments, an attachment procedure (admission control) of a NeNB providing temporary access and backhaul resource allocation are provided. In one embodiment, an NeNB is admitted either to the global network or a local break-out network.

In addition to NeNBs, the embodiments discussed herein are applicable to dense networks/heterogeneous networks where small cell base stations, e.g., pico or femto cells, are put in sleep mode to save energy when traffic demands are low. Turning on a small cell changes the backhaul requirements. In a network with a (many) small cell in sleep mode, the embodiments disclosed herein can be used to determine if a small cell should be turned on or which of a set of small cells should be turned on.

In addition to the nomadic node attachment procedures, embodiments are disclosed herein for providing functionality to dynamically allocated backhaul resources, e.g., by using the lambda controller to assign more wavelengths to a particular backhaul link in a DWDM backhaul architecture. The new functionalities proposed herein enable an integrated backhaul management by coupling the nomadic node attachment requirements to the possibility to dynamically allocate backhaul resources on demand.

In some embodiments, the systems and methods disclosed herein rely on (but are not limited to):
 a) Inclusion of the transport network's capability information as part of the conditions for a successful integration and support of new nomadic nodes in the network.
 b) Description of an attachment procedure of new nomadic nodes to an existing macro layer or UDN according to information given in a).
 c) Introduction of the DWDM-centric transport architecture solution in the context of moving networks, pointing out advantages such as the possibility to dynamic adapt the backhaul network features on demand, and not by over provisioning during deployment.

Embodiments of the present disclosure also potentially increase the probability of a nomadic node to integrate in the network in two dimensions:
 Does not limit the integration of the new node to the limitations of the anchor node backhaul link.
 Makes it possible for the network to allocate resources that can fit exactly the nomadic node traffic demands, i.e., the corresponding end-user data/service demands.

In addition, embodiments of the present disclosure have application in the fields of moving networks and UDNs, and can also be seen as an enabler mechanism for self-organizing networks.

The following acronyms are used throughout this disclosure.
 3G $3^{rd}$ Generation
 3GPP $3^{rd}$ Generation Partnership Project
 4G $4^{th}$ Generation
 5G $5^{th}$ Generation ASIC Application Specific Integrated Circuit
C-RAN Centralized or Cloud Radio Access Network
D2D Direct Device-to-Device Communication
DWDM Dense Wavelength Division Multiplexing
eNB Enhanced Node B
FP7 Seventh Framework Programme for Research and Technological Development
Gbps Gigabits per Second
kbps Kilobits per Second
LTE Long Term Evolution
Mbps Megabits per Second
MMC Massive Machine Communication
MN Moving Network
ms Millisecond
MS Mobile Station
NCE Network Control Entity
NeNB Nomadic Enhanced Node B
RAM Random Access Memory
RAN Radio Access Network
RF Radio Frequency
ROM Read Only Memory
RRH Remote Radio Head
UDN Ultra-Dense Network
UE User Equipment
URC Ultra-Reliable Communication Those skilled in the art will recognize improvements and modifications to the embodiments of the present disclosure. All such improvements and modifications are considered within the scope of the concepts disclosed herein and the claims that follow.

What is claimed is:

1. A method of operation of a network control entity to perform an attachment procedure for a nomadic network node in a cellular communications network, comprising:
   receiving an attach request for attachment of the nomadic node to an anchor node, the attach request comprising information indicative of one or more requirements of the nomadic node related to traffic and/or service demands;
   determining whether the one or more requirements of the nomadic node can be fulfilled with existing resources of a transport network that are allocated for the anchor node; and
   responsive to determining that the one or more requirements of the nomadic node can be fulfilled with the existing resources of the transport network that are allocated for the anchor node, sending, to the anchor node, an attach accept message to thereby accept attachment of the nomadic node to the anchor node.

2. The method of claim 1, further comprising, responsive to determining that the one or more requirements of the nomadic node cannot be fulfilled with the existing resources of the transport network that are allocated for the anchor node:
   attempting to allocate additional resources of the transport network for the anchor node in order to fulfill the one or more requirements of the nomadic node; and
   sending, to the anchor node, an attach accept message to thereby accept attachment of the nomadic node to the anchor node, if attempting to allocate the additional resources of the transport network for the anchor node is successful.

3. The method of claim 2, wherein the transport network utilizes a Dense Wavelength Division Multiplexing (DWDM) architecture, and wherein attempting to allocate the additional resources of the transport network for the anchor node comprises attempting to assign one or more additional wavelengths to a link in the transport network utilized by the anchor node.

4. The method of claim 2, further comprising sending, to the anchor node, an attach denial to thereby deny attachment of the nomadic node to the anchor node, if attempting to allocate the additional resources of the transport network for the anchor node is not successful.

5. The method of claim 2, further comprising, if attempting to allocate the additional resources of the transport network for the anchor node is not successful:
   determining whether the one or more requirements of the nomadic node can be fulfilled by another anchor node; and
   sending, to the anchor node, an attach denial comprising a recommendation that the nomadic node attach to the other anchor node if the one or more requirements of the nomadic node can be fulfilled by the other anchor node.

6. The method of claim 2, further comprising sending, to the anchor node, an attach denial and placing the nomadic node and/or the anchor node in an aware state, if attempting to allocate the additional resources of the transport network for the anchor node is not successful.

7. The method of claim 6, further comprising, after sending the attach denial and placing the nomadic node and/or the anchor node in the aware state, sending, to the anchor node, an attach accept message to thereby accept attachment of the nomadic node to the anchor node, when the one or more requirements of the nomadic node can be fulfilled with the existing resources of the transport network that are allocated for the anchor node.

8. The method of claim 6, further comprising, after sending the attach denial and placing the nomadic node and/or the anchor node in the aware state, sending, to the anchor node, an attach accept message to thereby accept attachment of the nomadic node to the anchor node, when attempting to allocate the additional resources of the transport network for the anchor node is successful.

9. The method of claim 2, further comprising sending, to the anchor node, an attach accept message with one or more conditions, to thereby accept attachment of the nomadic node to the anchor node with the one or more conditions.

10. The method of claim 9, wherein sending the attach accept message with the one or more conditions comprises sending the attach accept message with the one or more conditions, if attempting to allocate the additional resources of the transport network for the anchor node is not successful.

11. The method of claim 9, wherein the one or more conditions limit the attachment of the nomadic node to the anchor node to a local network including the anchor node.

12. The method of claim 9, wherein the one or more conditions are such that at least one of the one or more requirements of the nomadic node are not guaranteed.

13. The method of claim 9, further comprising, after accepting attachment of the nomadic node to the anchor node with the one or more conditions:
   monitoring for an anchor node that is able to fulfill the one or more requirements of the nomadic node; and
   upon identifying an anchor node that is able to fulfill the one or more requirements of the nomadic node, sending an attach request or an attach recommendation for attachment of the nomadic node to the anchor node that is able to fulfill the one or more requirements of the nomadic node.

14. The method of claim 1, further comprising sending, to the anchor node, an attach accept message with one or more conditions, to thereby accept attachment of the nomadic node to the anchor node with the one or more conditions, if the one or more requirements of the nomadic node can be fulfilled with the existing resources of the transport network that are allocated for the anchor node.

15. The method of claim 1, further comprising:
receiving a second attach request for attachment of the nomadic node to a second anchor node, the attach request and the second attach request being received substantially simultaneously; and
making a determination that the attach request and the second attach request both originate from the same nomadic node; and
processing the attach request and the second attach request based on the determination that the attach request and the second attach request both originate from the same nomadic node.

16. The method of claim 1, wherein the one or more requirements of the nomadic node include at least one of: data rate, expected attachment time, delay, latency, reliability, security, and expected traffic volume.

17. The method of claim 1, wherein the method further comprises, in association with accepting the attachment of the nomadic node to the anchor node, defining a preplanned alternate route for the nomadic node in case the anchor node de-attaches from the cellular communications network.

18. The method of claim 1, further comprising, over time:
receiving a plurality of additional attach requests for attachment of a plurality of nomadic nodes to a plurality of anchor nodes; and
dynamically allocating resources of the transport network to the plurality of anchor nodes based on requirements of the plurality of nomadic nodes as indicated by information included in the plurality of additional attach requests.

19. The method of claim 18, wherein the transport network utilizes a Dense Wavelength Division Multiplexing (DWDM) architecture, and dynamically allocating the resources of the transport network comprises dynamically assigning wavelengths to links utilized by the plurality of anchor nodes based on the requirements of the plurality of nomadic nodes included in the plurality of additional attach requests.

20. The method of claim 1, wherein the transport network is a backhaul network.

21. The method of claim 1, wherein the cellular communications network comprises a Centralized Radio Access Network (C-RAN) and the transport network comprises at least one of a backhaul network and a fronthaul network of the C-RAN.

22. A non-transitory computer-readable medium storing a computer program comprising program instructions that, when executed by processing circuitry of a network control entity, configure the network control entity to perform an attachment procedure for a nomadic network node in a cellular communications network, said computer program comprising instructions configuring the network control entity to, in response to receiving an attach request for attachment of the nomadic node to an anchor node, the attach request comprising information indicative of one or more requirements of the nomadic node related to traffic and/or service demands:
determine whether the one or more requirements of the nomadic node can be fulfilled with existing resources of a transport network that are allocated for the anchor node; and
responsive to determining that the one or more requirements of the nomadic node can be fulfilled with the existing resources of the transport network that are allocated for the anchor node, send, to the anchor node, an attach accept message to thereby accept attachment of the nomadic node to the anchor node.

23. A network control entity for a cellular communications network, comprising:
a communication subsystem; and
a processing subsystem configured to:
receive, via the communication subsystem, an attach request for attachment of a nomadic node to an anchor node, the attach request comprising information indicative of one or more requirements of the nomadic node related to traffic and/or service demands;
determine whether the one or more requirements of the nomadic node can be fulfilled with existing resources of a transport network that are allocated for the anchor node; and
upon determining that the one or more requirements of the nomadic node can be fulfilled with the existing resources of the transport network that are allocated for the anchor node, send, to the anchor node, an attach accept message to thereby accept attachment of the nomadic node to the anchor node.

24. A method of operation of a nomadic node in a cellular communications network, comprising:
detecting an anchor node; and
sending an attach request to the anchor node, the attach request comprising information indicative of one or more requirements of the nomadic node related to traffic and/or service demands of the nomadic node.

25. The method of claim 24, further comprising receiving a response to the attach request from the anchor node.

26. The method of claim 24, further comprising:
detecting one or more additional anchor nodes; and
sending an attach request to the one or more additional anchor nodes in addition to the attach request sent to the anchor node.

27. The method of claim 26, further comprising:
receiving attach responses from the anchor node and the one or more additional anchor nodes;
determining that the attach responses from at least two anchor nodes are attach accepts;
selecting one of the at least two anchor nodes as a selected anchor node; and
proceeding with attachment to the selected anchor node.

28. A non-transitory computer-readable medium storing a computer program comprising program instructions that, when executed by processing circuitry of a nomadic node configured for operation in a cellular communications network, configure the nomadic node to:
detect an anchor node; and
send an attach request to the anchor node, the attach request comprising information indicative of one or more requirements of the nomadic node related to traffic and/or service demands of the nomadic node.

29. A nomadic node for a cellular communications network, comprising:
a radio subsystem; and
a processing subsystem configured to:
detect an anchor node; and send, via the radio subsystem, an attach request to the anchor node, the attach request comprising information indicative of one or more requirements of the nomadic node related to traffic and/or service demands of the nomadic node.

* * * * *